US012722144B2

(12) United States Patent
Gao et al.

(10) Patent No.: US 12,722,144 B2
(45) Date of Patent: Sep. 1, 2026

(54) LARGE SCALE SYNTHESIS OF OXIDATIVE DEHYDROGENATION CATALYST

(71) Applicant: NOVA CHEMICALS (INTERNATIONAL) S.A., Fribourg (CH)

(72) Inventors: Xiaoliang Gao, Calgary (CA); Vasily Simanzhenkov, Calgary (CA); David Sullivan, Calgary (CA); Perry De Wit, Vernon (CA); Hanna Drag, Calgary (CA); Yoonhee Kim, Calgary (CA)

(73) Assignee: NOVA CHEMICALS (INTERNATIONAL) S.A., Fribourg (CH)

( * ) Notice: Subject to any disclaimer, the term of this patent is extended or adjusted under 35 U.S.C. 154(b) by 469 days.

(21) Appl. No.: 18/278,966

(22) PCT Filed: Feb. 10, 2022

(86) PCT No.: PCT/IB2022/051207

§ 371 (c)(1),
(2) Date: Aug. 25, 2023

(87) PCT Pub. No.: WO2022/180475

PCT Pub. Date: Sep. 1, 2022

(65) Prior Publication Data

US 2024/0149253 A1 May 9, 2024

Related U.S. Application Data

(60) Provisional application No. 63/154,438, filed on Feb. 26, 2021.

(51) Int. Cl.
*B01J 27/057* (2006.01)
*B01J 35/00* (2024.01)
(Continued)

(52) U.S. Cl.
CPC ........... *B01J 27/0576* (2013.01); *B01J 35/19* (2024.01); *B01J 35/40* (2024.01); *B01J 37/06* (2013.01); *B01J 37/08* (2013.01)

(58) Field of Classification Search
CPC .... B01J 2523/00; B01J 23/002; B01J 27/199; B01J 37/08; B01J 37/03; B01J 37/06; B01J 35/40; B01J 35/19; B01J 27/0576
See application file for complete search history.

(56) References Cited

U.S. PATENT DOCUMENTS

| | | | | |
|---|---|---|---|---|
| 2019/0366311 | A1 | 12/2019 | Mestl et al. | |
| 2020/0024215 | A1 | 1/2020 | Gao et al. | |
| 2020/0215516 | A1 * | 7/2020 | Mestl | B01J 35/638 |

FOREIGN PATENT DOCUMENTS

| | | | | |
|---|---|---|---|---|
| KR | 20090038745 A | 4/2009 | | |
| WO | WO-2017198762 A1 * | 11/2017 | | C07C 51/215 |
| WO | WO 2020/016828 | 1/2020 | | |

OTHER PUBLICATIONS

Chinese Office Action in Chinese Appln. No. 202280017609.2, dated Jun. 12, 2025, 20 pages, with English Translation.

(Continued)

*Primary Examiner* — Zakiya W Bates
(74) *Attorney, Agent, or Firm* — Fish & Richardson P.C.

(57) ABSTRACT

Catalysts and methods for large-scale production of the catalysts are described. An exemplary catalyst composition includes molybdenum, vanadium, tellurium, niobium, oxygen. In the catalyst composition, the molar ratio of molybdenum to vanadium is from 1:0.05 to 1:0.60, the molar ratio of molybdenum to tellurium is from 1:0.01 to 1:0.30, and the molar ratio of molybdenum to niobium is from 1:0.01 to 1:0.40. Oxygen is present at least in an amount to satisfy the valency of any present metal oxides, and the composition includes less than 1.0 wt. % of sulfur.

36 Claims, 7 Drawing Sheets

(51) Int. Cl.

| | |
|---|---|
| ***B01J 35/40*** | (2024.01) |
| ***B01J 37/06*** | (2006.01) |
| ***B01J 37/08*** | (2006.01) |

(56) References Cited

OTHER PUBLICATIONS

Finashina et al., "Effect of the conditions of preparing mixed oxide catalyst of Mo—V—Te—Nb—O composition on its activity in the oxidative dehydrogenation of ethane," Russian Journal of Physical Chemistry A, Dec. 1, 2013, 87(12):1983-1988.

PCT International Preliminary Report on Patentability in International Appln. No. PCT/IB2022/051207, dated Aug. 29, 2023, 7 pages.

PCT International Search Report and Written Opinion in International Application No. PCT/IB2022/051207, mailed on May 27, 2022, 11 pages.

Watanabe et al., "New synthesis route for Mo—V—Nb—Te mixed oxides catalyst for propane ammoxidation," Applied Catalysis A: General, Elsevier, Amsterdam, NL, Mar. 13, 2000, 194-195:479-485.

* cited by examiner

300

600

LARGE SCALE SYNTHESIS OF OXIDATIVE DEHYDROGENATION CATALYST

CROSS-REFERENCE TO RELATED APPLICATIONS

This application is a National Stage Application under 35 U.S.C. § 371 and claims the benefit of International Application No. PCT/IB2022/051207, filed Feb. 10, 2022, which claims the benefit of priority to U.S. Provisional Application Ser. No. 63/154,438, filed Feb. 26, 2021, the entirety of which is incorporated herein by reference.

TECHNICAL FIELD

The present disclosure relates generally to oxidative dehydrogenation (ODH) catalysts and systems. More specifically, large-scale syntheses of ODH catalysts.

BACKGROUND ART

Olefins like ethylene, propylene, and butylene, are basic building blocks for a variety of commercially valuable polymers. Since naturally occurring sources of olefins do not exist in commercial quantities, polymer producers rely on methods for converting the more abundant lower alkanes into olefins. The method of choice for today's commercial scale producers is steam cracking, a highly endothermic process where steam-diluted alkanes are subjected very briefly to a temperature of at least 800° C. The fuel demand to produce the required temperatures and the need for equipment that can withstand that temperature add significantly to the overall cost. In addition, the high temperature promotes the formation of coke, which accumulates within the system, resulting in the need for costly periodic reactor shut down for maintenance and coke removal.

Oxidative dehydrogenation processes (ODH), are an alternative to steam cracking that are exothermic and produce little or no coke. In ODH, a lower alkane, such as ethane, is mixed with oxygen in the presence of a catalyst and optionally an inert diluent, such as carbon dioxide, nitrogen, or steam, which may be performed at temperatures as low as 300° C., to produce the corresponding alkene. Various other oxidation products may be produced in this process, including carbon dioxide and acetic acid, among others. As the commercialization of ODH processes continue, research into the scaling up of production of commercial scale catalysts is needed.

SUMMARY OF INVENTION

An exemplary embodiment described in examples herein provides a catalyst composition including molybdenum, vanadium, tellurium, niobium, oxygen. In the catalyst composition, the molar ratio of molybdenum to vanadium is from 1:0.05 to 1:0.60, the molar ratio of molybdenum to tellurium is from 1:0.01 to 1:0.30, and the molar ratio of molybdenum to niobium is from 1:0.01 to 1:0.40. Oxygen is present at least in an amount to satisfy the valency of any present metal oxides, and wherein the composition includes less than 1.0 wt. % of sulfur.

Another exemplary embodiment described in examples herein provides a precalcined catalyst composition including molybdenum, vanadium, tellurium, niobium, oxygen, and sulfur. In the catalyst composition, the molar ratio of molybdenum to vanadium is from 1:0.05 to 1:0.60, the molar ratio of molybdenum to tellurium is from 1:0.01 to 1:0.30, and the molar ratio of molybdenum to niobium is from 1:0.05 to 1:0.40. Oxygen is present at least in an amount to satisfy the valency of any present metal oxides and sulfur, when present, makes up 0.001 wt. % to 0.25 wt. % of the composition. The composition is prepared by a method that includes hydrothermally reacting an aqueous mixture including molybdenum, vanadium, tellurium, and niobium to provide a prewashed ODH catalyst precursor including more than 0.5 wt. % sulfur, and washing the prewashed ODH catalyst precursor with a solution including a water to provide the ODH catalyst precursor including less than 1.0 wt. % sulfur.

Another exemplary embodiment described in examples herein provides a method of preparing a catalyst composition including molybdenum, vanadium, tellurium, niobium, oxygen, and, optionally, sulfur. In the catalyst composition, the molar ratio of molybdenum to vanadium is from 1:0.05 to 1:0.60, the molar ratio of molybdenum to tellurium is from 1:0.01 to 1:0.30, and the molar ratio of molybdenum to niobium is from 1:0.05 to 1:0.40. Oxygen is present at least in an amount to satisfy the valency of any present metal oxides and sulfur, when present, makes up less than 0.25 wt. % of the composition. The method includes hydrothermally reacting an aqueous mixture including molybdenum, vanadium, tellurium, and niobium to provide a prewashed catalyst composition including more than 0.5 wt. % sulfur, and washing the prewashed catalyst composition with a solution including a polar solvent to provide the catalyst composition including less than 0.25 wt. % sulfur.

Another exemplary embodiment described in examples herein provides a catalyst material including molybdenum, vanadium, tellurium, niobium, and oxygen. In the catalyst material, the molar ratio of molybdenum to vanadium is from 1:0.12 to 1:0.49, the molar ratio of molybdenum to tellurium is from 1:0.01 to 1:0.30, and the molar ratio of molybdenum to niobium is from 1:0.01 to 1:0.30. Oxygen is present at least in an amount to satisfy the valency of any present metal oxides and sulfur, when present, includes less than 0.01 wt. % of the catalyst material.

Another exemplary embodiment described in examples herein provides a method of preparing a catalyst material including molybdenum, vanadium, tellurium, niobium, oxygen, and sulfur. The method includes hydrothermally reacting an aqueous mixture including molybdenum, vanadium, tellurium, and niobium to provide a prewashed composition including more than 0.5 wt. % sulfur. The method includes washing the prewashed composition with a solution including a polar solvent to provide a catalyst composition including molybdenum, vanadium, tellurium, niobium, oxygen, and sulfur. In the catalyst composition, the molar ratio of molybdenum to vanadium is from 1:0.05 to 1:0.60, the molar ratio of molybdenum to tellurium is from 1:0.01 to 1:0.30, and the molar ratio of molybdenum to niobium is from 1:0.01 to 1:0.40. Oxygen is present in the catalyst composition at least in an amount to satisfy the valency of any present metal oxides. Sulfur makes up less than 0.25 wt. % of the composition. The method includes calcining the catalyst composition to provide the catalyst material, and wherein the molar ratio of molybdenum to vanadium is from 1:0.12 to 1:0.49, the molar ratio of molybdenum to tellurium is from 1:0.01 to 1:0.30, and the molar ratio of molybdenum to niobium is from 1:0.01 to 1:0.30; and wherein oxygen is present at least in an amount to satisfy the valency of any present metal oxides and sulfur, when present, includes less than 0.01 wt. % of the catalyst material.

DESCRIPTION OF EMBODIMENTS

Figure 1A:
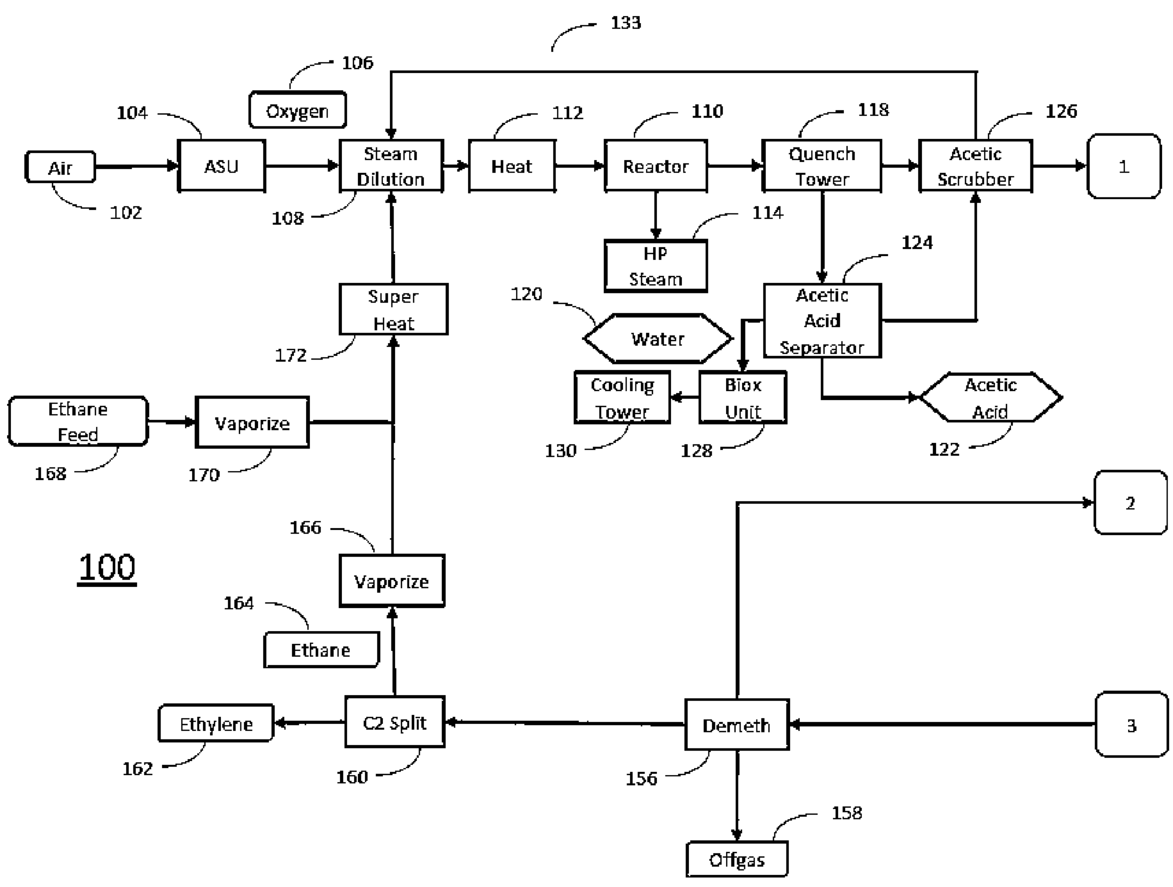
FIGS. 1A and 1B are block diagrams of an oxidative dehydrogenation system for the oxidative dehydrogenation of light hydrocarbons, in accordance with examples.

Oxidative dehydrogenation (ODH) is generally used to form ethylene, or other alpha-olefins, from ethane. Embodiments described herein provide a preparation process for large-scale amounts, e.g., batches of 2 kg, or greater, of a catalyst system for an oxidative dehydrogenation reaction. The catalyst includes molybdenum (Mo), vanadium (V), tellurium (Te), niobium (Nb), and oxygen (O). Multi-component metal oxide catalysts, such as $MoVTeNbO_x$, for the oxidative dehydrogenation of alkanes are known. Such catalysts are typically made by mixing solutions of metals and then precipitating the metal oxide precursor from the mother solution and then calcining the dried precursor to form a catalyst. Calcined catalysts exhibit improved catalytic properties compared to an uncalcined precursor, e.g., improved selectivity towards desired olefin products or improved process stability. As a result, multi-component metal oxide catalysts are typically calcined before being put into service in process applications. However, the uncalcined catalysts exists in a 'pluripotent' state. It may be differentiated into various potential fixed chemical states, depending on the calcination derivation procedures employed. Therefore, catalyst calcination steps may negatively affect catalyst properties if it not carried out under the correct conditions or lacking a precursory workup step.

One of the major problems encountered with a scale up is filtering the catalyst. The filtering step separates solid catalyst from the aqueous solution and washes out contaminating byproduct salts, such as sulfur and nitrogen compounds. When the salts are left in the catalyst, they may decompose the catalyst during calcination, which decreases the performance of the catalyst. Accordingly, a large quantity of water, about 29 L of water per kg of catalyst, is generally used to wash out the salts. However, during the filtration, it is often difficult to remove the salts while preventing some of the solid catalyst particles from escaping to waste. The process provided in examples herein enables the manufacture of the $MoVTeNbO_x$ ODH catalyst on large scales, e.g., greater than about 2 Kg, without using as much water as previous processes, e.g., about 12 L of water per kg of catalyst. This effectively removes the contaminating salts without losing a portion of the solid catalyst particles to waste.

The techniques described herein include an air-treatment step before calcination, using stagnant air, which reduces the amount of water used for the filtration and washing. Flowing air treatment steps have been used as part of a high temperature, (550-650° C.), inert gas (nitrogen) calcination. However, the air treatment described herein involves treatment with stagnant air at 250° C. in an oven rather than flowing air over a catalyst bed inside a calcination unit. The catalyst bed-depth may be between 5 and 12 cm, to allow large loadings during air treatment. As used herein, large loadings may have a surface area of about 980 $cm^2$, while small loadings may have a surface area of less than about 104 $cm^2$. The amounts of materials in large loadings are based on the examples, e.g., see Table 3.6. These results can be compared against Catalyst Materials 3. X (Table 4.3) and Catalyst Materials 4. X (Table 5.4) to see the difference example scales makes and the requirement for meeting S spec.

As used herein, the term "catalyst material" refers to a material that includes an active catalyst that can promote the oxidative dehydrogenation of ethane to ethylene, for example, on a support. The catalyst material can be a plurality of particles or a formed catalyst material. Non-limiting examples of formed catalyst materials include extruded catalyst materials, pressed catalyst materials, and cast catalyst materials. Non-limiting examples of pressed and cast catalyst materials includes pellets—such as tablets, ovals, and spherical particles.

As used herein, the term "catalyst composition" generally refers to the active catalyst portion of a catalyst material. The catalyst composition is generally processed in further steps to form a catalyst material.

Notwithstanding that the numerical ranges and parameters setting forth the broad scope of the disclosure are approximations, the numerical values set forth in the specific examples are reported as precisely as possible. Any numerical values, however, inherently contain certain errors necessarily resulting from the standard deviation found in their respective testing measurements.

In addition, it should be understood that any numerical range recited herein is intended to include all sub-ranges subsumed therein. For example, a range of "1 to 10" is intended to include all sub-ranges between and including the recited minimum value of 1 and the recited maximum value of 10, that is, having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

As used herein, the term "alkane" refers to an acyclic saturated hydrocarbon. In many cases, an alkane consists of hydrogen and carbon atoms arranged in a linear structure in which all of the carbon-carbon bonds are single bonds. Alkanes have the general chemical formula $C_nH_{2n+2}$. In some embodiments, alkane refers to one or more of ethane, propane, butane, pentane, hexane, octane, decane, and dodecane. In particular embodiments, alkane refers to ethane and propane and, in some embodiments, ethane.

As used herein, the term "alkene" refers to unsaturated hydrocarbons that contain at least one carbon—carbon double bond. In many embodiments, alkene refers to alpha olefins. In some embodiments, alkene refers to one or more of ethylene, propylene, 1-butene, butadiene, pentene, pentadiene, hexene, octene, decene, and dodecene. In particular embodiments, alkene refers to ethylene and propylene and, in some embodiments, ethylene.

As used herein, the terms "alpha olefin" or "α-olefin" refer to a family of organic compounds, which are alkenes (also known as olefins) with a chemical formula $C_xH_{2x}$, distinguished by having a double bond at the primary or alpha (α) position. In some embodiments, alpha olefin refers to one or more of ethylene, propylene, 1-butene, 1-pentene, 1-hexene, 1-octene, 1-decene and, 1-dodecene. In particular embodiments, alpha olefins refer to ethylene and propylene and, in some embodiments, ethylene.

As used herein, the term "essentially free of oxygen" means the amount of oxygen present, if any, remaining in a process stream after the one or more ODH reactors, and in many embodiments after the second reactor as described herein, is low enough that it will not present a flammability or explosive risk to the downstream process streams or equipment.

As used herein, the term "fixed bed reactor" refers to one or more reactors, in series or parallel, often including a cylindrical tube filled with catalyst pellets with reactants flowing through the bed and being converted into products. The catalyst in the reactor may have multiple configurations including, but not limited to, one large bed, several horizontal beds, several parallel packed tubes, and multiple beds in their own shells.

As used herein, the term "fluidized bed reactor" refers to one or more reactors, in series or parallel, often including a fluid (gas or liquid) which is passed through a solid granular catalyst, which can be shaped as tiny spheres, at high enough velocities to suspend the solid and cause it to behave as though it were a fluid.

As used herein, the term "monomer" refers to small molecules containing at least one double bond that reacts in the presence of a free radical polymerization initiator to become chemically bonded to other monomers to form a polymer.

As used herein, the term "moving bed reactor" refers to reactors in which the catalytic material flows along with the reactants and is then separated from the exit stream and recycled.

As used herein, the term "$MoVO_x$ catalyst" refers to a mixed metal oxide having the empirical formula $Mo_{65-7.0}V_3O_d$, where d is a number to at least satisfy the valence of the oxide; a mixed metal oxide having the empirical formula $Mo_{6.25-7.25}V_3O_d$, where d is a number to satisfy the valence of the oxide, or combinations thereof.

As used herein, the term, "olefinic monomer" includes, without limitation, α-olefins, and in particular embodiments ethylene, propylene, 1-butene, 1-hexene, 1-octene, and combinations thereof.

In the disclosure, "reactive oxygen" means oxygen taken up by the oxidative dehydrogenation catalyst, which is available to be used in the oxidative dehydrogenation reaction and removed from the catalyst.

In the disclosure the term "reactive oxygen depleted" when referring to the catalyst in the pre-reactor is not intended to mean absolute oxygen depletion. Rather it means that the levels of residual reactive oxygen in the catalyst is sufficiently low so that there is less than 25%, preferably less than 15% most preferably less than 10% of the maximum amount of oxygen, which has been be taken up by the catalyst. After giving up reactive oxygen the catalysts comprises metal oxides, which do not give up oxygen.

Substantially saturated with reactive oxygen means that not less than 60%, preferably more than 70%, most preferably more than 85% of the reactive oxygen has been complexed with the oxidative dehydrogenation catalyst.

As used herein, the term "substantially free of acetylene" means the amount of acetylene present, if any, remaining in a process stream after the one or more ODH reactors, and in many embodiments after the second reactor as described herein, is undetectable using the analytical techniques described herein or zero vppm.

As used herein, the term "swing bed type reactor arrangement" is a gas phase reactor system where a first vessel effectively operates as a reactor and a second vessel effectively operates as a regenerator for regenerating the catalyst system. This arrangement can be used with fixed bed as well as fluidized bed ODH reactors.

In some embodiments disclosed herein, the degree to which carbon monoxide is produced during the ODH process can be mitigated by converting it to carbon dioxide, which can then act as an oxidizing agent. The process can be manipulated to control the output of carbon dioxide from the process to a desired level. Using the methods described herein, a user may choose to operate in carbon dioxide neutral conditions such that surplus carbon dioxide need not be flared or released into the atmosphere.

Figure 1B:
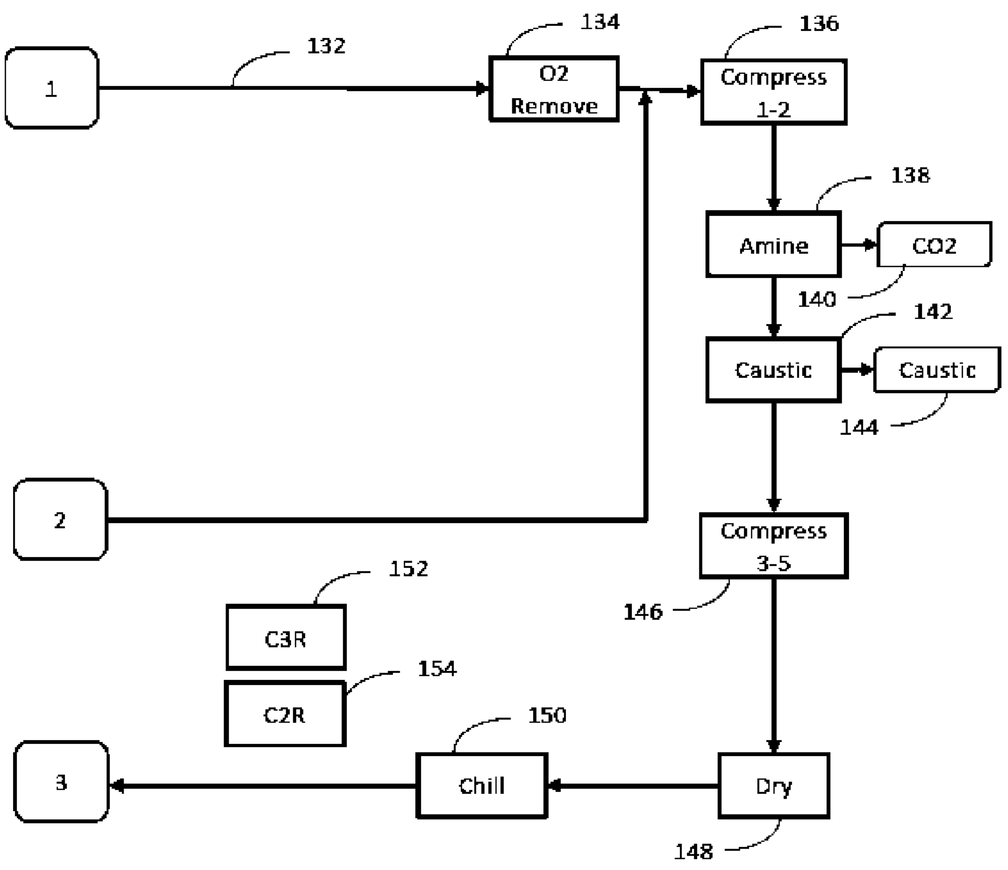

FIGS. 1A and 1B are block diagrams of an oxidative dehydrogenation system 100 for the oxidative dehydrogenation of light hydrocarbons, in accordance with examples. The oxidizing agent generally used in the process is air 102, although oxygen, generally mixed with a diluent, may also be used. The air 102 is flowed into an air separation unit (ASU) 104. In the ASU 104, the oxygen 106 is separated from other gases, such as nitrogen and carbon dioxide, among others. The oxygen 106 may then be mixed with a diluent, for example, in a steam dilution system 108.

To avoid process upsets, in many embodiments, mixtures of one or more alkanes with oxygen are employed using ratios that fall outside of the flammability envelope of the one or more alkanes and oxygen. In some embodiments, the ratio of alkanes to oxygen may fall outside the upper flammability envelope. In these embodiments, the percentage of oxygen in the mixture can be less than 30 wt. %, in some cases less than 25 wt. %, or in other cases less than 20 wt. %, but greater than zero.

In embodiments with higher oxygen percentages, alkane percentages can be adjusted to keep the mixture outside of the flammability envelope. While a person skilled in the art would be able to determine an appropriate ratio level, in many cases the percentage of alkane is less than about 40 vol. % and greater than zero. As a non-limiting example, where the mixture of gases prior to ODH includes 20 vol. % oxygen and 40 vol. % alkane, the balance can be made up with an inert diluent. Non-limiting examples of useful inert diluents in this embodiment include, but are not limited to, one or more of steam, nitrogen, and carbon dioxide, among others. In some embodiments, the inert diluent should exist in the gaseous state at the conditions within the reactor and should not increase the flammability of the hydrocarbon added to the reactor, characteristics that a skilled worker would understand when deciding on which inert diluent to employ. The inert diluent either can be added to of the alkane containing gas or the oxygen containing gas prior to entering the ODH reactor or may be added directly into the ODH reactor.

Although a number of different hydrocarbons may be used, in an oxidative dehydration process, generally ethane is provided to the reactor along with oxygen. In some embodiments, the volumetric feed ratio of oxygen to ethane ($O_2/C_2H_6$) provided to the one or more ODH reactors can be at least about 0.3, in some cases at least about 0.4, and in other cases at least about 0.5 and can be up to about 1, in some cases up to about 0.9, in other cases up to about 0.8, in some instances up to about 0.7 and in other instances up to about 0.6. The volumetric feed ratio of oxygen to ethane can be any of the values or range between any of the values recited above.

In some embodiments, mixtures that fall within the flammability envelope may be employed, for example, in instances where the mixture exists in conditions that prevent propagation of an explosive event. In these non-limiting examples, the flammable mixture is created within a medium where ignition is immediately quenched. As a further non-limiting example, a user may design a reactor where oxygen and the one or more alkanes are mixed at a point where they are surrounded by a flame arresting material. Any ignition would be quenched by the surrounding material. Flame arresting materials include, but are not limited to, metallic or ceramic components, such as stainless steel walls or ceramic supports. In some embodiments, oxygen and alkanes can be mixed at a low temperature, where an ignition event would not lead to an explosion, then introduced into the reactor before increasing the temperature. The flammable conditions do not exist until the mixture is surrounded by the flame arrestor material inside of the reactor.

The amount of steam added to the ODH process in the steam dilution system 108 affects the degree to which carbon dioxide acts as an oxidizing agent. In some embodiments, steam may be added directly to the ODH reactor 110, or steam may be added to the individual reactant components—the lower alkane, oxygen, or inert diluent—or combinations thereof and subsequently introduced into the ODH reactor 110 along with one or more of the reactant components. Alternatively, steam may be added indirectly as water mixed with either the lower alkane, oxygen or inert diluent, or a combination thereof, with the resulting mixture being preheated before entering the reactor. When adding steam indirectly as water, a heater 112 is used to increase the temperature so that the water is entirely converted to steam before entering the reactor.

Increasing the amount of steam added to the ODH reactor 110 increases the degree to which carbon dioxide acts as an oxidizing agent. Decreasing the amount of steam added to the ODH reactor 110 decreases the degree to which carbon dioxide acts as an oxidizing agent. In some embodiments, a user monitors the carbon dioxide output and compares it to a predetermined target carbon dioxide output. If the carbon dioxide output is above the target, a user can then increase the amount of steam added to the ODH process. If the carbon dioxide output is below the target, a user can decrease the amount of steam added to the ODH process, provided steam has been added. Setting a target carbon dioxide output level is dependent on the requirements for the user. In some embodiments, increasing the steam added will have the added effect of increasing the amount of acetic acid and other by-products produced in the process. As larger amounts of acetic acid from the output of the ODH may be generated by higher levels of steam, reducing steam levels will decrease the amount generated. Conversely, higher levels of steam will increase the amount of carbon dioxide consumed.

In some embodiments, the amount of steam added to the ODH reactor 110 can be up to about 50 vol. %, in some circumstances up to about 40 vol. %, in some cases up to about 35 vol. %, in other cases up to about 30 vol. %, and in some instances up to about 25 vol. % and can be zero, in some cases at least 0.5 vol. %, in other cases at least 1 vol. %, in other cases at least 5 vol. %, in some instances at least 10 vol. % and in other instances at least 15 vol. % of the stream entering the ODH reactor 110. The amount of steam in the stream entering the ODH reactor 110 can be any value or range between any of the values recited above. As used herein, the ODH reactor 110 may include a single reactor, or multiple reactors.

In some embodiments when using two or more ODH reactors a user may choose to control carbon dioxide output in only one, or less than the whole complement of reactors. For example, a user may opt to maximize carbon dioxide output of an upstream reactor so that the higher level of carbon dioxide can be part of the inert diluent for the subsequent reactor. In that instance, maximizing carbon dioxide output upstream minimizes the amount of inert diluent that would need to be added to the stream prior to the next reactor.

There is no requirement for adding steam to an ODH process, as it is one of many alternatives for the inert diluent. For processes where no steam is added, the carbon dioxide output is maximized under the conditions used with respect to ethane, oxygen, and inert diluent inputs. Decreasing the carbon dioxide output can be performed by adding steam to the reaction until carbon dioxide output drops to the desired level. In embodiments where oxidative dehydrogenation, or oxidative dehydrogenation, conditions do not include addition of steam, and the carbon dioxide output is higher than the desired carbon dioxide target level, steam may be introduced into the reactor while keeping relative amounts of the main reactants and inert diluent—lower alkane, oxygen and inert diluent—added to the reactor constant, and monitoring the carbon dioxide output, increasing the amount of steam until carbon dioxide decreases to the target level.

In some embodiments, a carbon dioxide neutral process can be achieved by increasing steam added so that any carbon dioxide produced in the oxidative dehydrogenation process can then be used as an oxidizing agent such that there is no net production of carbon dioxide. Conversely, if a user desires net positive carbon dioxide output then the amount of steam added to the process can be reduced or eliminated to maximize carbon dioxide production. As the carbon dioxide levels increase there is potential to reduce oxygen consumption, as carbon dioxide is competing as an oxidizing agent. The skilled person would understand that using steam to increase the degree to which carbon dioxide acts as an oxidizing agent can affect oxygen consumption. The implication is that a user can optimize reaction conditions with lower oxygen contributions, which may assist in keeping mixtures outside of flammability limits.

From the heater 112, the feed is introduced into the ODH reactor 110. The ODH reactor 110 may be any of the known reactor types applicable for a selective oxidation process, such as the ODH of alkanes. In some embodiments, the ODH reactor 110 is a conventional fixed bed reactor. In a typical fixed bed reactor, reactants are introduced into the reactor at one end, and flow past an immobilized catalyst, during which products are formed. The products leave the ODH reactor 110 at the opposite end from where the feed is introduced. Designing a fixed bed reactor suitable for the methods disclosed herein can follow techniques known for reactors of this type. A person skilled in the art would know which features are required with respect to shape and dimensions, inputs for reactants, outputs for products, temperature, and pressure control, and means for immobilizing the catalyst.

In some embodiments, the use of inert non-catalytic heat dissipative particles can be used within one or more of the ODH reactors. In various embodiments, the heat dissipative particles are present within the bed and include one or more non catalytic inert particulates having a melting point at least 30° C., in some embodiments at least 250° C., in further embodiments at least 500° C. above the temperature upper control limit for the reaction; a particle size in the range of 0.5 to 75 mm, in some embodiments 0.5 to 15, in further embodiments in the range of 0.5 to 8, in further embodiments in the range of 0.5 to 5 mm; and a thermal conductivity of greater than 30 W/mK (watts/meter Kelvin) within the reaction temperature control limits. In some embodiments, the particulates are metal alloys and compounds having a thermal conductivity of greater than 50 W/mK (watts/meter Kelvin) within the reaction temperature control limits. In some embodiments, the particles are minerals or metal oxides. Non-limiting examples of suitable metals that can be used in these embodiments include, but are not limited to, silver, copper, gold, aluminum, steel, stainless steel, molybdenum, tungsten, and quartz sand.

The heat dissipative particles can have a particle size of from about 1 mm to about 15 mm. In some embodiments, the particle size can be from about 1 mm to about 8 mm. The heat dissipative particles can be added to the fixed bed in an amount from 5 to 95 wt. %, in some embodiments from 30 to 70 wt. %, in other embodiments from 45 to 60 wt. % based on the entire weight of the fixed bed. The particles are employed to potentially improve cooling homogeneity and reduction of hot spots in the fixed bed by transferring heat directly to the walls of the reactor. As described herein, in embodiments the ODH reactor 110 may be cooled by the generation of high-pressure steam 114, for example, in a jacket around or coils within the ODH reactor 110.

Additional embodiments include the use of a fluidized bed reactor, where the catalyst bed can be supported by a porous structure, or a distributor plate, located near a bottom end of the reactor and reactants flow through at a velocity sufficient to fluidize the bed, e.g., the catalyst rises and begins to swirl around in a fluidized manner. The reactants are converted to products upon contact with the fluidized catalyst and the reactants are subsequently removed from the upper end of the reactor. Design considerations those skilled in the art can modify and optimize include, but are not limited to, the shape of the reactor, the shape and size of the distributor plate, the input temperature, the output temperature, and reactor temperature and pressure control.

Some embodiments include using a combination of both fixed bed and fluidized bed reactors, each with the same or different ODH catalyst. The multiple reactors can be arrayed in series or in parallel configuration, the design of which falls within the knowledge of the worker skilled in the art.

In some embodiments, the stream exiting the one or more ODH reactors can be treated to remove or separate water and water-soluble hydrocarbons from the stream exiting the one or more ODH reactors. In some embodiments, this stream is fed to a second reactor.

In some embodiments, the stream exiting the ODH reactor 110 is directed to a quench tower 118 to be cooled and condensed. This facilitates the removal of oxygenates, such as water 120 and acetic acid 122, via a bottom outlet that feeds an acetic acid separator 124. The acetic acid separator 124 separates an acetic acid stream 122 from the water 120, as well as separating a gas stream that is returned to an acetic acid scrubber 126. The water 120 may be treated in a bio oxidation unit 128 to remove any remaining carbon compounds, such as traces of acetic acid, among others. From the bio oxidation unit 128, the water 120 may be fed to a cooling tower 130 as a makeup stream.

The remaining gases from the quench tower 118 are fed to the acetic acid scrubber 126, along with separated gases from the acetic acid separator 124. The acetic acid scrubber 126 may remove traces of acetic acid, and other carbon compounds, from these gas streams by oxidation or adsorption.

Figure 2:
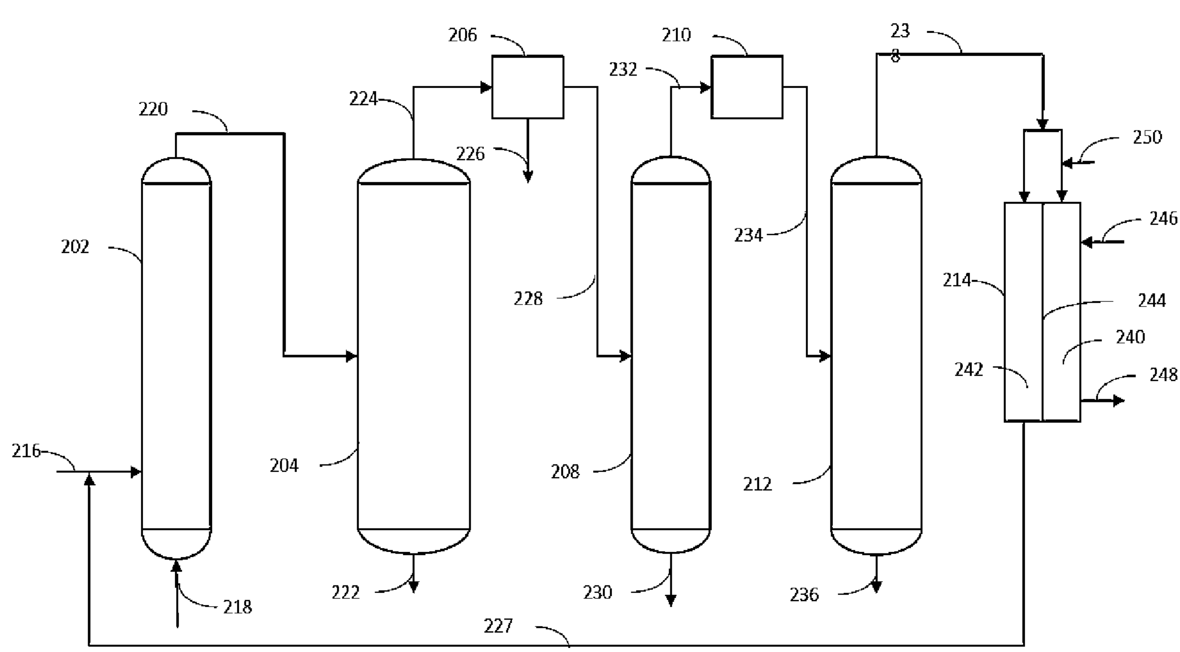
FIG. 2 is a graphic depiction of a chemical complex, according to some embodiments.
Figure 3:
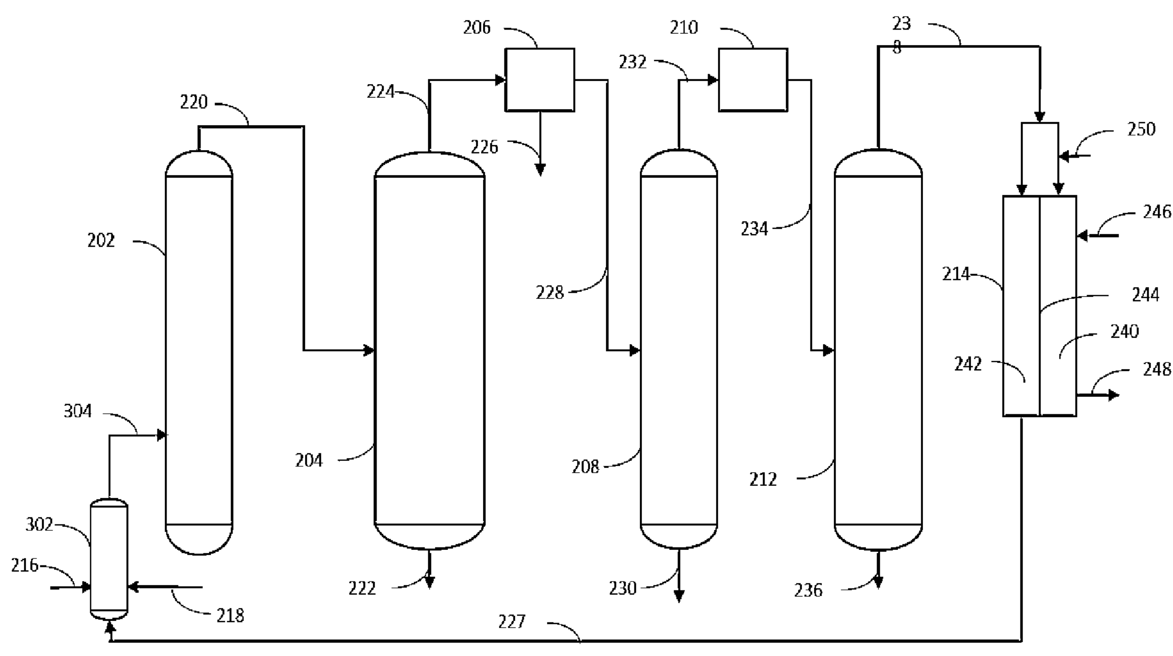
FIG. 3 is a graphic depiction of a chemical complex according to some embodiments.

A stream 132 containing unconverted lower alkane (such as ethane), corresponding alkene (such as ethylene), unreacted oxygen, carbon dioxide, carbon monoxide, optionally acetylene and inert diluent, is allowed to exit the acetic acid scrubber 126 and are fed to an oxygen removal system 134 (FIG. 1B), or to a second reactor, as described with respect to FIGS. 2 and 3. In some embodiments, a portion 133 of the stream 132 is recycled to the reaction, for example, by being returned to the steam dilution system 108 for mixing with the feed streams to the reactor 110.

The oxygenates removed via the quench tower 118 and/or acetic acid scrubber 126 can include carboxylic acids (for example acetic acid), aldehydes (for example acetaldehyde) and ketones (for example acetone). The amount of oxygenate compounds remaining in the stream 132 exiting the scrubber and fed to the oxygen removal system 134 will often be zero, for example, below the detection limit for analytical test methods typically used to detect such compounds. When oxygenates can be detected they can be present at a level of up to about 1 per million by volume (ppmv), in some cases up to about 5 ppmv, in other cases less than about 10 ppmv, in some instances up to about 50 ppmv and in other instances up to about 100 ppmv and can be present up to about 2 vol. %, in some cases up to about 1 vol. %, and in other cases up to about 1,000 ppmv. The amount of oxygenates or acetic acid in the stream exiting the scrubber and fed to the oxygen removal system 134 can be any value, or range between any of the values recited above.

In the oxygen removal system 134, as described herein, a high temperature membrane may be used to remove oxygen from the stream 132 exiting the acetic acid scrubber 126. The high temperature membrane may be heated by combusting access hydrocarbons in the stream 132, by combusting fuel added to the oxygen removal system 134, or both. A stream 101 exiting the acetic acid scrubber 126 can be recycled to the steam dilution system 108.

From the oxygen removal system, the stream 132 may be compressed, for example, in a first compressor system 136. The first compressor system 136 may include a single compressor or a series of compressors that sequentially boost the pressure of the stream 132. The compressed stream may then be fed to an amine scrubber 138 to remove $CO_2$ 140 from the compressed stream, as described in further detail herein. From the amine scrubber 138, the compressed stream may be fed to a caustic wash tower 142. The caustic wash tower 142 further reduces the concentration of $CO_2$ in the compressed gas stream, sending the $CO_2$ in a rich caustic stream 144. The rich caustic stream 144 may then be treated to form a lean caustic stream, which is returned to the caustic wash tower 142.

The purified gas stream from the caustic wash tower 142 may include unconverted lower alkane (such as ethane) and the corresponding alkene (such as ethylene), and excess inert diluent, such as nitrogen. The purified gas stream may be compressed in a second compressor system 146. The second compressor system 146 may include a single compressor or a chain of compressors that sequentially boost the pressure of the purified gas. The compressed purified gas may then be passed to a dryer 148 to remove excess water vapor from the amine scrubber 138 and the caustic wash tower 142. The dryer 148 may include molecular sieves to absorb the water, or may include a series of heat exchangers and chillers to physically condense the water, or both.

The dried stream is then passed to a chiller 150. The chiller 150 may include a series of heat exchangers, such as propane chilled heat exchangers, compressed nitrogen chilled heat exchangers, and heat exchangers cooled by fluids from other portions of the process. The chiller 150 may be integrated with, or feed, a depropanizer (C3R) 152, a deethanizer (C2R) 154, or both.

Returning to FIG. 1A, the chilled gas stream is fed to a demethanizer 156. From the demethanizer 156, an off gas stream 158 is sent to waste or to downstream processes. The off gas stream 158 includes the remainder of the inert diluent as well as methane removed from the chilled gas stream. Further, the demethanizer 156 returns a portion of the $C_2$ compounds, such as ethylene and ethane, to the process upstream of the first compressor system 136. A $C_2$ stream from the demethanizer 156 is fed to a $C_2$ splitter 160.

The $C_2$ splitter 160 divides the $C_2$ stream into an ethylene product stream 162 and an ethane feed stream 164. The ethane feed stream 164 is vaporized in a heat exchanger 166 to form an ethane gas feed stream. An ethane feed 168 from another ethane source may be vaporized in a heat exchanger 170 and blended into the ethane gas feed stream.

The ethane gas feed stream is then passed through a high temperature heat exchanger 172 to be superheated. The superheated ethane gas feed stream is then fed to the steam dilution system 108 for use in the process. The core reaction process, including the separation of oxygenates, amine washing, and caustic washing are described further with respect to FIGS. 2 and 3, below.

FIG. 2 is a graphic depiction of a chemical complex 200, according to some embodiments. In the following description, like parts are designated by like reference numbers. In some embodiments, the chemical complex, shown in one embodiment schematically in FIG. 2, includes, in cooperative arrangement, an ODH reactor 202, a quench tower and/or acetic acid scrubber 204, a second reactor 206 (as described herein), an amine wash tower 208, a drier 210, a distillation tower 212, and an oxygen separation module 214. The ODH reactor 202 includes an ODH catalyst capable of catalyzing, in the presence of oxygen, which may be introduced via an oxygen line 216, the oxidative dehydrogenation of alkanes introduced via an alkane line 218. Although the second reactor 206 is shown directly after quench tower or acetic acid scrubber 204, it can be placed further downstream. In many cases, the process configuration can be more energy efficient if the second reactor 206 is placed after the input stream has been compressed.

The ODH reaction may also occur in the presence of an inert diluent, such as carbon dioxide, nitrogen, or steam, that is added to ensure the mixture of oxygen and hydrocarbon are outside of flammability limits. As described herein, the inert diluent may (e.g., carbon dioxide or steam) or may not (e.g., nitrogen) participate in the ODH reaction. Determination of whether a mixture is outside of the flammability limits, for the prescribed temperature and pressure, is within the knowledge of the skilled worker. An ODH reaction that occurs within the ODH reactor 202 may also produce, depending on the catalyst and the prevailing conditions within the ODH reactor 202, a variety of other products which may include carbon dioxide, carbon monoxide, oxygenates, and water. These products leave the ODH reactor 202, along with unreacted alkane, corresponding alkene, residual oxygen, carbon monoxide, and inert diluent, if added, via the ODH reactor product line 220.

The ODH reactor product line 220 is directed to the quench tower or acetic acid scrubber 204, which quenches the products from the ODH reactor product line 220 and facilitates removal of oxygenates and water via the quench tower bottom outlet 222. Unconverted lower alkane, corresponding alkene, unreacted oxygen, carbon dioxide, carbon monoxide, and inert diluent that are added to the quench tower or acetic acid scrubber 204 exit through quench tower overhead line 224 and are directed into the second reactor 206.

The second reactor 206 contains the group 11 metal with optional promoter and optional support as described above, which causes unreacted oxygen to react with carbon monoxide to form carbon dioxide or, optionally, reacts acetylene with the carbon monoxide to reduce or eliminate it. In the second reactor 206, most or all of the unreacted oxygen and acetylene is consumed. All or a portion of the carbon dioxide in the second reactor 206 can be recycled back to the ODH reactor 202 via recycle lines 226 and 227 to act as an oxidizing agent as described above. The remaining unconverted lower alkane, corresponding alkene, unreacted oxygen (if present), all or part of the carbon dioxide, carbon monoxide (if present), and inert diluent are conveyed to amine wash tower 208 via line 228.

Any carbon dioxide present in line 228 is isolated by an amine wash tower 208 and captured via a carbon dioxide bottom outlet 230 and may be sold, or, alternatively, may be recycled back to the ODH reactor 202 as described above. Constituents introduced into the amine wash tower 208 via line 228, other than carbon dioxide, leave the amine wash tower 208 through an amine wash tower overhead line 232, and are passed through the dryer 210 before being directed to a distillation tower 212 through line 234. In the distillation tower 212, $C_2/C_{2+}$ hydrocarbons are isolated and removed via $C_2/C_{2+}$ hydrocarbons bottom outlet 236. The remainder includes mainly $C_1$ hydrocarbons, including remaining inert diluent and carbon monoxide (if any), which leave the distillation tower 212 via an overhead stream 238 and is directed to an oxygen separation module 214.

The oxygen separation module 214 includes a sealed vessel having a retentate side 240 and a permeate side 242, separated by an oxygen transport membrane 244. The overhead stream 238 may be directed into either of the retentate side 240 or the permeate side 242. Optionally, a flow controlling means, as discussed herein, may be included to allow for flow into both sides at varying levels. In that instance, an operator may choose what portion of the flow from overhead stream 238 enters the retentate side 240 and what portion enters the permeate side 242. Depending upon conditions, an operator may switch between the two sides, to allow equivalent amounts to enter each side, or bias the amount directed to one of the two sides. The oxygen separation module 214 also includes air input 246 for the introduction of atmospheric air, or other oxygen containing gas, into the retentate side 240. Combustion of products introduced into the retentate side 240, due to the introduction of oxygen, may contribute to raising the temperature of the oxygen transport membrane 244 to at least about 850° C. so that oxygen can pass from the retentate side 240 to the permeate side 242. Components within the atmospheric air, or other oxygen containing gas, other than oxygen, cannot pass from the retentate side 240 to the permeate side 242 and can only leave oxygen separation module 214 via exhaust 248.

The passing of oxygen from the retentate side 240 to the permeate side 242 effects the separation of oxygen from atmospheric air, or other oxygen containing gas, introduced into the retentate side 240. The result is the production of oxygen enriched gas on the permeate side 242, which is then directed via an oxygen enriched bottom line 227 to the ODH reactor 202, either directly or in combination with the oxygen line 216 (as shown in FIG. 1). When overhead stream 238 is directed into the retentate side 240, the degree of purity of oxygen in oxygen-enriched bottom line 220 can approach 99 vol. %. Conversely, when overhead stream 238 is directed into the permeate side 242 the degree of purity of oxygen in the oxygen enriched bottom line 220 is lower, with an upper limit ranging from 80 vol. %-90 vol. % oxygen, the balance in the form of carbon dioxide, water, and remaining inert diluent, all of which do not affect the ODH reaction as contemplated by the present disclosure and can accompany the enriched oxygen into the ODH reactor 202. Water and carbon dioxide can be removed by quench tower 204 and amine wash tower 208, respectively. In some embodiments of the disclosure, some or all of the carbon dioxide can be captured for sale as opposed to being flared where it contributes to greenhouse gas emissions. In other embodiments, when carbon dioxide is used in the ODH process, any carbon dioxide captured in the amine wash can be recycled back to the ODH reactor 202.

The oxygen transport membrane 244 is temperature dependent, only allowing transport of oxygen when the temperature reaches at least about 850° C. In some embodiments, the components in the overhead stream 238 by themselves are not capable, upon combustion in the presence of oxygen, to raise the temperature of the oxygen transport membrane 244 to the required level. In this embodiment, the chemical complex of the present disclosure also includes the fuel enhancement line 250, upstream of the oxygen separation module 214, where combustible fuel, as a non-limiting example methane, may be added to supplement the combustible products from the overhead stream 238.

In some embodiments, a concern for ODH processes is the mixing of a hydrocarbon with oxygen. Under certain conditions, the mixture may be unstable and lead to an explosive event. Mixers may be used to mix a hydrocarbon containing gas with an oxygen containing gas in a flooded mixing vessel. By mixing in this way, pockets of unstable compositions are surrounded by a non-flammable liquid so that even if an ignition event occurred it would be quenched immediately. Provided addition of the gases to the ODH reaction is controlled so that homogeneous mixtures fall outside of the flammability envelope, for the prescribed conditions with respect to temperature and pressure, the result is a safe homogeneous mixture of hydrocarbon and oxygen.

In some embodiments, there is a flooded gas mixer 302 (FIG. 3) upstream of the ODH reactor 202. In this instance, the oxygen line 216 and the alkane line 218 feed directly into flooded gas mixer 302. A homogeneous mixture that includes hydrocarbon and oxygen, and optionally an inert diluent, can be introduced into the ODH reactor 202 from flooded gas mixer 302 via mixed line 304 (FIG. 3). The oxygen-enriched bottom line 227 may feed directly into the flooded gas mixer 302 or in combination with the oxygen line 216 into the flooded gas mixer 302.

The temperature of the contents within the product line 220 in a typical ODH process can reach about 450° C. It can be desirable to lower the temperature of the stream before introduction into the quench tower or acetic acid scrubber 204 as described above. In that instance, the present disclosure contemplates the use of a heat exchanger immediately downstream of each the ODH reactor 202 and immediately upstream of the acetic acid scrubber 204. Use of a heat exchanger to lower temperatures in this fashion is well known in the art.

FIG. 3 is a graphic depiction of a chemical complex 300 according to some embodiments. As indicated above, with reference to FIG. 2, in the ODH process configuration depicted in FIG. 3, although the second reactor 206 is shown directly after quench tower or the acetic acid scrubber 204, it can be placed further downstream. In many cases, the process configuration can be more energy efficient if the second reactor 206 is placed after the input stream has been compressed.

In some embodiments, the olefins produced using the one or more ODH reactors, or any of the processes or complexes described herein, can be used to make various olefin derivatives. Olefin derivatives include, but are not limited to polyethylene, polypropylene, ethylene oxide, propylene oxide, polyethylene oxide, polypropylene oxide, vinyl acetate, vinyl chloride, acrylic esters (e.g., methyl methacrylate), thermoplastic elastomers, thermoplastic olefins, and blends and combinations thereof.

In some embodiments, ethylene and optionally α-olefins are produced in the one or more ODH reactors, or any of the processes or complexes described herein, and are used to make polyethylene. The polyethylene made from the ethylene and optional α-olefins described herein can include homopolymers of ethylene, copolymers of ethylene and α-olefins, resulting in HDPE, MDPE, LDPE, LLDPE, and VLDPE.

The polyethylene produced using the ethylene and optional α-olefins described herein can be produced using any suitable polymerization process and equipment. Suitable ethylene polymerization processes include, but are not limited to gas phase polyethylene processes, high pressure polyethylene processes, low pressure polyethylene processes, solution polyethylene processes, slurry polyethylene processes and suitable combinations of the above arranged either in parallel or in series.

The present disclosure also contemplates use of various tools commonly used for chemical reactors, including flowmeters, compressors, valves, and sensors for measuring parameters such as temperature, pressure and flow rates. It is expected that the person of ordinary skill in the art would include these components as deemed necessary for safe operation.

EXAMPLES

General Procedures

Reagents

Reagents purchased from manufacturers were used as received, without further purification. All reagents, with the exceptions of niobium (V) oxide hydrate and ammonium hydroxide, were purchased from Sigma Aldrich. Ammonium molybdate ($(NH_4)_6Mo_7O_{24}\cdot 4\ H_2O$), vanadium (IV) oxide sulfate hydrate ($VOSO_4\cdot 3.41H_2O$), telluric acid ($Te(OH)_6$), oxalic acid, and 95-98% sulfuric acid were purchased from Sigma Aldrich. The supplied certificates of analysis were used to establish the hydrate content for different batches. Niobium (V) oxide hydrate ($Nb_2O_5\cdot xH_2O$) was purchased from Companhia Brasileira de Metalurgia e Mineração (CBMM) as the product Niobia HY-340, which contains 20 wt. % water. Ammonium hydroxide, 28-30%, was purchased from Anachemia, VWR Company. Distilled water was prepared inhouse using a Corning Mega Pure 12A System ACS as distillation apparatus.

TABLE 1

Materials and sources.

| # | Chemical Name | Chemical Formula | CAS No. | Laboratory Supply Source | Product No. |
|---|---|---|---|---|---|
| 1 | ammonium molybdate tetrahydrate | $(NH_4)_6Mo_7O_{24}\,x4H_2O$ | 12054-85-2 | SIGMA-ALDRICH | A7302 |
| 2 | telluric acid | $Te(OH)_6$ | 7803-68-1 | SIGMA-ALDRICH | 86375 |
| 3 | vanadyl sulfate hydrate | $VOSO_4\,x3\text{-}5H_2O$ | 123334-20-3 | SIGMA-ALDRICH | 233706 |
| 4 | diniobium pentaoxide hydrate | 80% $Nb_2O_5$ & 20% $H_2O$ | 1313-96-8 | COMPANHIA BRASILEIRA DE METALURGIA E MINERAÇ ÃO (CBMM) | NIOBIA HY-340 |
| 5 | oxalic acid | C2H2O4 | 144-62-7 | SIGMA-ALDRICH | 75688 |
| 6 | sulfuric acid, 95-98% | $H_2SO_4$ | 7664-93-9 | SIGMA-ALDRICH | 258105 |
| 7 | ammonium hydroxide, 28-30% | $NH_4OH$ | 1336-21-6 | Anachemia, a VWR Company | 05566-461 |

MRU

Figure 4:
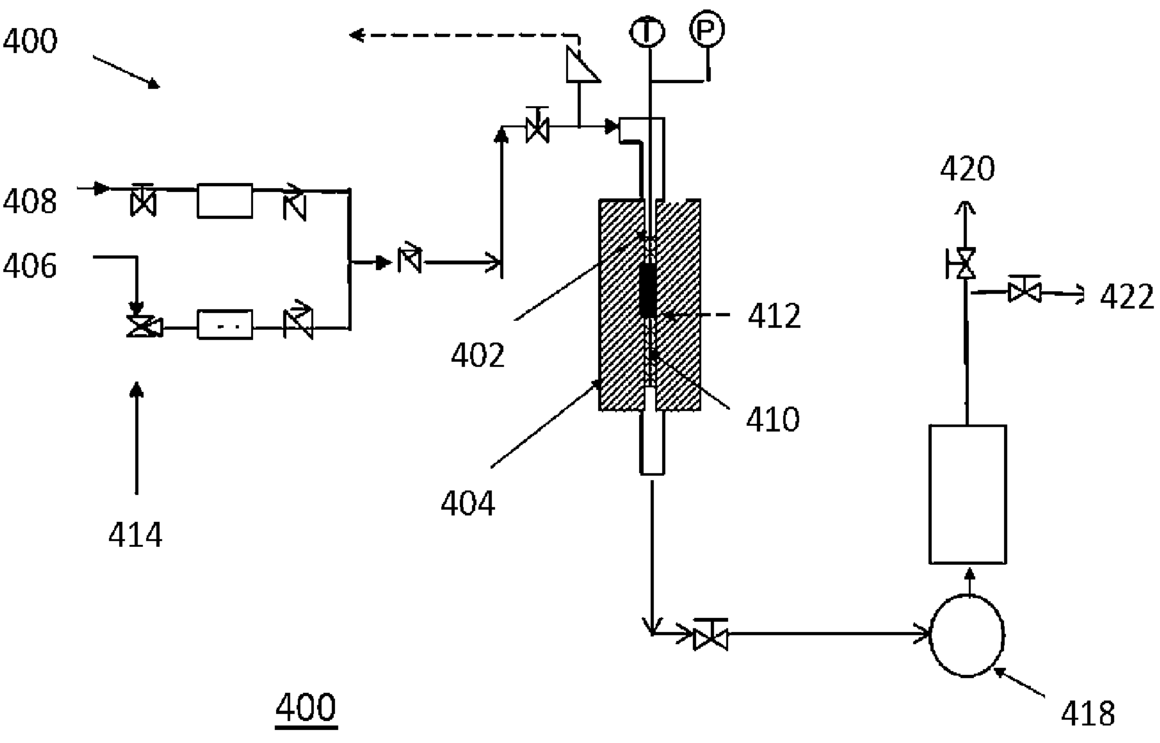
FIG. 4 is a schematic of a microreactor unit (MRU) as described in examples.

FIG. 4 is a schematic of a microreactor unit (MRU) 400 as described in examples. The ability of catalysts and catalyst materials described herein to participate in the oxidative dehydrogenation of ethane were tested in the MRU 400. The MRU 400 consists of fixed bed tube reactor 402, which is surrounded by two-zone electric heater 404. The fixed bed tube reactor 402 is a SWAGELOK® 316L stainless steel tube, which has an outside diameter of 0.5 inches (about 1.27 cm) and inside diameter of 0.4 inches (about 1 cm) and a length of 14.96 inches (about 38 cm). Two main feed gas lines are attached to reactor 402. One line 406 is dedicated for a bulk nitrogen purge gas and the other line 408 is connected to a dual solenoid valve, which can be switched from ODH process feed gas (gas mixture of ethane/oxygen/Nitrogen at a molar ratio of about 36/18/46) to compressed air when regenerating a catalyst bed.

A 6-point WIKA Instruments Ltd. K-type thermocouple 410, which had an outer diameter of 0.125 inches was inserted through the reactor 402, and was used to measure and control the temperature within the catalyst bed 412. The thermocouple 410 is shown in detail in FIG. 5. A room temperature glass tight sealed condenser was located after the reactor to collect water/acidic acid condensates. The gas product flow was allowed to either vent or was directed to a gas chromatography (Agilent 6890N Gas Chromatograph, Using Chrom Perfect—Analysis, Version 6.1.10 for data evaluation) via a sampling loop.

To prepare catalyst and catalyst materials for testing in the MRU 400, the catalyst or catalyst material was loaded into a 1-inch round die and pressed with 8 tons of compression force for 10 to 15 seconds of dwelling time. The pressed catalyst or catalyst material was then crushed into small pieces using a mortar and pestle. The crushed catalyst or catalyst material was sieved and a particle sizes between 425 μm and 1000 μm were collected to be loaded for testing on the MRU.

For safety reasons the unit is programmed in a way that prevents air from mixing with the feed gas. This is accomplished through safety interlocks and a mandatory 15-minute nitrogen purge of the reactor when switching between feed gases fed through line 408 and air 414 fed through line 406. The flow of gases is controlled by mass flow controllers. The catalyst is loaded in the middle zone of reactor 402 forming a catalyst bed 412. The rest of reactor 402, below and above catalyst bed 416 is packed with 100% quartz sand and the load is secured with glass wool on the top and the bottom of reactor 402. A glass tight sealed condenser 418 is located after reactor 402 at room temperature to collect water/acidic acid and the gas product can flow to either vent 420 or sampling loop/vent 422 by a three-way solenoid valve.

The catalyst bed 412 placed in the reactor tube can include the catalyst or catalyst material and a filler. For the MRU experiments described herein, the catalyst bed 412 was prepared by physically mixing 1.96 g of catalyst with quartz sand such that the catalyst bed 412 had a total volume of about 3 mL. The quartz sand functions as a filler or heat sink. As described herein, a filler refers to a material that does not participate in the oxidative dehydrogenation of ethane or have other catalytic activity, such as non-selective oxidation under the MRU test conditions. The ratio of catalyst or catalyst material to filler is 1:1 (by volume). The catalyst bed 412 was loaded in the middle zone of the reactor, for example, located between points 2 and 5 of the thermocouple, and the remaining volume of the reactor was packed with quartz sand. The load was then secured with glass wool on the top and the bottom of reactor.

Figure 5:
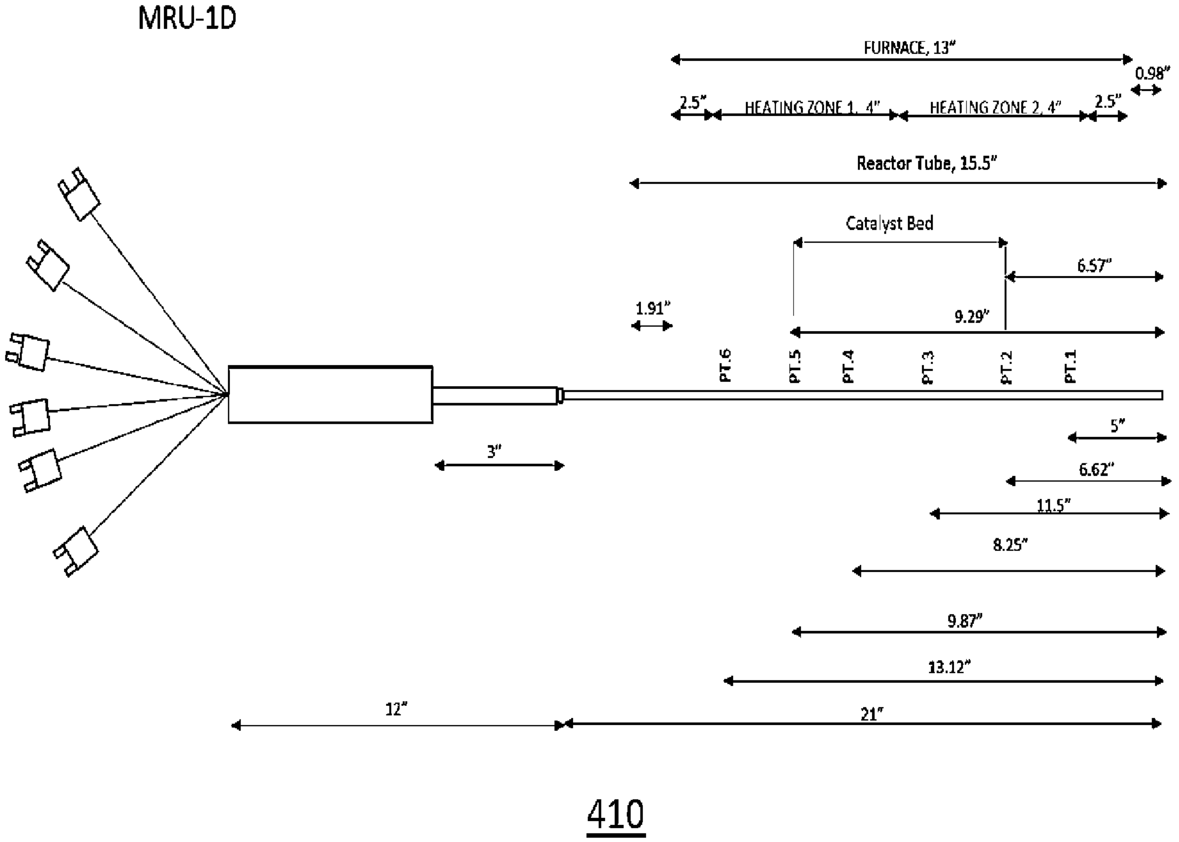
FIG. 5 Micro Reactor Unit (MRU) thermocouple fabrication drawing, showing locations of the six thermocouple-measurement points.

FIG. 5 is drawing of the MRU thermocouple, showing the locations of the six-thermocouple-measurement points. As described herein, the catalyst bed is loaded into the reactor so it is located between thermocouple points 2 and 5.

For the MRU testing, a pre-mixed feed gas was fed through the reactor. The pre-mixed feed gas entering the reactor was 35 mol % ethane, 17.5 mol % oxygen, and 47.5 mol % nitrogen. Further, the pre-mixed feed gas flow was adjusted by a calibrated mass flow controller to obtain a constant weight hourly space velocity (WHSV) of 2.90 $h^{-1}$, based on the catalyst weight in the catalyst bed. The flow rate of the feed gas was controlled to a setpoint of 74.6 standard cubic centimeters per minute (sccm) via the mass flow controllers.

The 35% conversion temperature (also referred to herein as the 35 mol % ethane conversion temperature or 35% conversion temperature) is determined at a weight hourly space velocity (WHSV) of 2.90 $h^{-1}$, with the WHSV based on the amount of catalyst or the amount of catalyst used to prepare the catalyst material, and a gas hourly space velocity (GHSV) of about 3,000 $h^{-1}$. Whereby WHSV is defined as mass flow of feed gas to the reactor divided by the weight of the catalyst in the catalyst bed, GHSV is defined as volumetric flow of the reactor feed gas divided by the volume of the catalyst bed.

Typically, the inlet pressure was in the range of about 1 pound per square inch gauge (psig) to about 2.5 psig and the outlet pressure was in the range of about 0 psig to about 0.5 psig. The gas feed exiting the catalyst bed can be analyzed by gas chromatography to determine the percent of various hydrocarbons (e.g., ethane and ethylene) and, optionally other gases such as $O_2$, $CO_2$, and CO.

The gas exiting the reactor was analyzed by gas chromatography (Agilent 6890N Gas Chromatograph, Using Chrom Perfect—Analysis, Version 6.1.10 for data evaluation) to determine the percent of various hydrocarbons (e.g., ethane and ethylene) and, optionally other gases such as $O_2$, $CO_2$, and CO and acetylene.

A catalyst or catalyst material's 35% conversion temperature was determined as follows. Conversion of the feed gas was calculated as a mass flow rate change of ethane in the product compared to feed ethane mass flow rate using the following formula:

$$C = \left( \frac{2 * X_{Ethylene} + X_{CO2} + X_{CO}}{2 * X_{Ethylene} + 2 * X_{Ethane} + X_{CO2} + X_{CO}} \right) * 100\%$$

In the above equation, C is the percent of feed gas that has been converted from ethane to another product (i.e., ethane conversion) and X is the molar concentration of the corresponding compound in the gaseous effluent exiting the reactor at corresponding temperature. The ethane conversion was then plotted as a function of temperature to acquire a linear algebraic equation. The linear equation for ethane conversion was solved to determine the temperature in which the ethane conversion was 35%, i.e., the 35% conversion temperature.

Further, the gas exiting the reactor was analyzed by gas chromatography to determine catalyst or catalyst material selectivity to ethylene (i.e., the percentage on a molar basis of ethane that forms ethylene). Selectivity to ethylene was determined using the following equation:

$$S_{Ethylene} = \left( \frac{2 * X_{Ethylene}}{2 * X_{Ethylene} + X_{CO2} + X_{CO}} \right) * 100\%$$

In the above equation, $S_{Ethylene}$ is the selectivity to ethylene and X is the molar concentration of the corresponding compound in the gaseous effluent exiting the reactor at corresponding temperature. The selectivity to ethylene was determined at the 35% conversion temperature, unless otherwise indicated. As such, after the 35% conversion temperature was determined, the above equation for selectivity was solved using the corresponding values for $X_{Ethylene}$, $X_{CO2}$, and $X_{CO}$ at the 35% conversion temperature.

ICP-MS

Inductively Coupled Plasma Mass Spectrometry (ICP-MS), sensitive enough to detect elements in ppb concentration ranges, was the analytical technique used for measuring the elemental composition of catalyst or catalyst materials. ICP-MS analysis was performed on an Agilent 7700X ICP-MS system. Liquid samples were introduced to ICP as an aerosol through a nebulizer and spray chamber. The argon plasma dried the aerosol and dissociated the sample's molecules into atomic ions. The ions were directed towards the MS detector and were separated based on their mass-to-charge ratio and measured by a detector to produce a signal that was proportional to the ions' concentration. Quantitative determination of atoms' concentration in the original sample was determined with the use of an external standard calibration. The calibration curves were constructed after subtracting the reagent blank. Concentrations were given in ng/mg (wt.-ppm) or μg/g (wt.-ppm) units in this analysis.

General ICP-MS Procedure for Catalysts Containing Molybdenum, Vanadium, Niobium, and Tellurium Samples were prepared by placing approximately 10-20 mg of catalyst material and 3.5-4.0 g of oxalic acid in a vial. Then, 15-20 mL of distilled water was added to create a suspension. The suspension was heated in an oil bath at 90° C. with rigorous mixing. Dissolution of the catalyst generally took 24-72 hours to produce a homogenous, blue solution. After dissolution is complete, the resulting blue solution is diluted to a final volume of 60-80 mL. The diluted solution is then further diluted 10-100× using 5% nitric acid and analyzed by ICP-MS.

Typical ICP-MS multi-element scan optimizes the instrument parameters to scan for trace (ppb) levels of 50+ elements. However, the 50+ elements included in the multi-element does not include Nb, nor is it calibrated for higher concentrations, e.g., greater than about 10 wt. %. Therefore, when scanning for the four elements present in catalyst samples, higher concentrations of calibration standards were used, and the instrument sensitivity was reduced as the elements of interest were found in percent levels. This was done by preparing calibration standards for each of the four elements. These calibration standards were prepared in percentage levels (high ppm concentrations) for Mo, V, Nb, and Te. The ICP-MS program was developed such that only the four elements were detected with a high degree of accuracy and therefore, the 50+ elements that were normally calibrated to ppm level concentrations were excluded, as the detector was calibrated for high ppm concentrations for the four elements of interest.

CHN+S Analysis

CHN+S analysis was performed on select samples using a LECO CHN628 Series Determinator with a Sulfur Add-On Module, where carbon, hydrogen, nitrogen and sulfur are determined using a sample combustion and product gas analysis technique. A pre-weighed and encapsulated sample is placed in the instrument's loader where the sample is transferred to the instrument's purge chamber directly above the furnace, eliminating atmospheric gases from the transfer process. The sample is then introduced to the primary combustion furnace, which contains only pure oxygen. This results in a rapid and complete oxidation. Carbon, hydrogen, nitrogen, and sulfur present in the sample are oxidized to form $CO_2$, $H_2O$, $NO_x$ and $SO_x$ gases, respectively, and are swept by the oxygen carrier through a secondary furnace for further oxidation and particulate removal.

The combination gases are then collected in a vessel known as a ballast for equilibration. The homogenized gases from the ballast are swept through a 10 $cm^2$ aliquot loop and, using an ultra-high purity helium carrier gas, on to the detectors. Separate, optimized non-dispersive infrared (NDIR) cells are utilized for the detection of $CO_2$, $SO_2$, and $H_2O$. The $NO_x$ gases are passed through a reduction tube filled with copper to reduce the $NO_x$ gases to $N_2$ and remove any excess oxygen present from the combustion process. The aliquot gas then passes through scrubbers to remove $CO_2$ and $H_2O$ and onto a thermal conductivity cell (TC) utilized to detect the $N_2$. Prior to every set of samples, the instrument is calibrated using certified standards.

FTIR

Fourier Transform Infrared Spectroscopy (FTIR) is a technique used to obtain an infrared spectrum (IR) of a solid or liquid sample by shining monochromatic light over the sample and measuring light absorbance over a range of wavelengths. The FTIR technique can be used as a finger-printing technique, where the IR spectrum of an unknown sample is overlaid with the IR spectrum of a known sample, or it can be used to identify characteristic absorptions that represent a particular kind of molecular bond, e.g., C═O, O—H, N—H, C—H, C—O, S—O, S═O, etc. Solid samples were prepared for FTIR scanning by a pressed KBr pellet technique. Liquid samples were prepared for FTIR scanning by dabbing a small amount of the liquid sample onto a KBr cell and then pressing a second KBr cell overtop of the first. The instrument onsite is a Bruker Tensor 27 FTIR Spectrophotometer and employs a laser at operating wavelength of 633 nm.

FTIR is a useful method to screen the LEEP catalyst before calcination because sulfate anions have a distinct emission frequency within the infrared spectrum, which can be used to qualitatively screen if the catalyst has any wt. % residual sulfate anions. The particulars of the S—O/S═O emission peaks are described in the Results Section.

Yield Calculations

Theoretical Yield calculations were based on the mols of metal salt used in a preparation. The theoretical moles of the final product were predicted by assuming that the molybdenum, vanadium, tellurium, and niobium have attained the highest oxidation states in the product after hydrothermal reaction. Thus, molybdenum, vanadium, niobium, and tellurium formed $MoO_3$, $V_2O_5$, $Nb_2O_5$, and $TeO_3$, respectively. The moles of the starting material was multiplied by the respective molar equivalents of each of the total oxidized species. The moles were then multiplied by the predicted theoretical weight of the fully oxidized final product in order to get the final theoretical weight of the catalyst.

For example, the following weights and mols of salts were used:

$(NH_4)_6Mo_7O_{24}\cdot 4H_2O$=4865.0 g;3.94 mol;

$VOSO_4\cdot 3.41H_2O$=4023.5 g;18.01 mol;

$Nb_2O_5\cdot 3.69H_2O$=656.3 g;1.98 mol; and $Te(OH)_6$=1054.6 g;4.59 mol

Then the theoretically yield, weight, and mols, of the corresponding oxides would be as follows:

$MoO_3$=4628.4 g;32.16 mol;

$V_2O_5$=1638.0 g;9.01 mol;

$Nb_2O_5$=525.1 g;1.98 mol;

$TeO_3$=806.6 g;4.59 mol; and

Total theoretical mass=7598.07 g.

If the mass of product recovered were 6300 g, for example, then the percent yield of the preparation would be about 83%. The percent yield was determined by diving the actual measured yield by the theoretical yield and multiplying by 100.

Synthesis of Catalyst Compositions 1.1-1.8 (Uncalcined Samples)

Common Synthesis Procedure for Uncalcined Catalyst Compositions 1.1-1.7

To a vessel, 10 L of distilled water was added and heated to 65° C. 1102.0 grams of oxalic acid ($C_2H_2O_4$(s); 12.240 mol; SIGMA-ALDRICH®) was added to the 65° C. distilled water, which dissolved quickly with stirring to form a clear, colorless solution. To the 65° C. aqueous oxalic acid solution was added 656.3 grams of diniobium pentaoxide hydrate ($Nb_2O_5\cdot 3.69H_2O$(s); 1.975 mol equivalents of $Nb_2O_5$; CBMM), forming a white suspension. The vessel opening was rinsed with 1 L of distilled water to wash the powders into the solution, producing a total volume of 11 L. The 11 L of aqueous, white suspension was left to heat and stir at 65° C. for at least 24 hours (up to 72 hours). After 24 hours of 65° C. heating, the solution was cooled down to ambient conditions and appeared clear and colorless when left at stand still (without stirring) with only a small amount of white insoluble matter visible. The resulting almost clear, colorless solution was aqueous niobium oxalate, $H_3[NbO(C_2O_4)_3]$(aq).

To a vessel, 11 L of distilled water was added and heated to 60° C. 4023.5 grams of vanadyl sulfate hydrate ($VOSO_4\cdot 3.41H_2O$(s); 18.10 mol; SIGMA-ALDRICH) was added to the 60° C. distilled water, which dissolved slowly over time with vigorous stirring to form a clear, blue solution. The vessel opening was rinsed with 1 L of distilled water to wash the powders into the solution, producing a total volume of 12 L of 60° C., $VOSO_4$(aq) solution.

To a vessel, 6 L of distilled water was added and heated to 60° C. 1054.6 grams of telluric acid ($TeOH_6$(s); 4.593 mol; SIGMA-ALDRICH) was added to the 60° C. distilled water, which dissolved quickly with stirring to form a clear, colorless solution. The vessel opening was rinsed with 1 L of distilled water to wash the powders into the solution, producing a total volume of 7 L. The 60° C., 7 L $TeOH_6$(aq) solution was cooled down to room temperature for use in the next steps.

To a jacketed glass reactor, 16 L of distilled water was added and heated via circulating bath and silicone oil. The 16 L of distilled water was heated to 30-35° C. and 4865.0 grams of ammonium molybdate tetrahydrate ($(NH_4)_6Mo_7O_{24}\cdot 4H_2O$(s); 3.934 mol) was added, which dissolved with stirring to form a white, some-what turbid solution. The vessel opening was rinsed with 1 L of distilled water to wash the powders into the solution, producing a total volume of 17 L. The entire 7 L of $TeOH_6$(aq) solution was transferred at ambient temperature to the stirred, 30-35° C. $(NH_4)_6Mo_7O_{24}\cdot 4H_2O$(aq) turbid solution at 412 mL/min to form a clear and colorless solution of $(NH_4)_6Mo6TeO_{24}$(aq). The telluric acid vessel was rinsed with 1 L of distilled water and the rinsing is transferred to the glass reactor. The resulting $(NH_4)_6Mo6TeO_{24}$(aq) solution was heated up to the target temperature of 80° C. (temperature range 75-85° C. throughout this part of the preparation). Once the $(NH_4)_6Mo6TeO_{24}$(aq) solution was heated to approx. 75° C., the pH of the $(NH_4)_6Mo6TeO_{24}$(aq) solution was adjusted to 7.50±0.1 using 1680-2000 grams (calculated 1.85-2.20 L at density of 0.91 g/cm3) of 28-30% ammonium hydroxide solution. The pH 7.50 $(NH_4)_6Mo6TeO_{24}$(aq) solution was stirred at 80° C.

for 1 hour. After 1 hour, the temperature of the $(NH_4)_6Mo6TeO_{24}$(aq) solution was decreased to 70-75° C. to prepare for the next step, which produces substantial amount of heat. The pH of the 70-75° C. $(NH_4)_6Mo6TeO_{24}$(aq) solution is adjusted from 7.50 to 5.00±0.1 using 1270-1550 grams (calculated 0.69-0.84 L at density of 1.85 g/cm3) of 95-98% sulfuric acid, with a final solution temperature of 80-85° C. being obtained, even with active cooling. Both the acid ($H_2SO_4$) and base ($NH_4OH$) addition steps produced substantial heat, which were controlled via a temperature control bath with the capability of heating and cooling the circulated silicone bath. Once the $(NH_4)_6Mo6TeO_{24}$(aq) solution was adjusted to pH 5.00±0.1, the resulting $(NH_4)_6Mo6TeO_{24}$(aq) solution was transferred to a pre-heated 60° C. high-pressure reactor. The jacketed glass reactor vessel was rinsed with 2 L of distilled water and these washing were transferred to the 316 Stainless Steel high-pressure reactor that contains a special glass sleeve insert for hydrothermal reaction. The 60-80° C. $(NH_4)_6Mo6TeO_{24}$(aq) solution is stirred via an agitator inside the high-pressure reactor.

To the stirred, 60-80° C. $(NH_4)_6Mo6TeO_{24}$(aq) solution in the high-pressure reactor, the entire volume of 60° C. vanadyl sulfate solution was transferred at rate of 367 mL/min. The vanadyl sulfate vessel was washed with 2 L of distilled water and these rinsing were transferred rapidly to the high-pressure reactor. The resulting solution is stirred for 30 minutes at 60-80° C.

After 30 minutes, the entire volume of room temp niobium oxalate solution was transferred to the approx. 60° C. high pressure reactor at 183 mL/min to form a complex mixture that included solids and solutions of Mo, Te, V, & Nb metal oxide/salt solutions (mixture is referred to as slurry). The niobium oxalate vessel was washed with 2 L of distilled water and these rinsing were transferred to the high-pressure reactor. Once all chemicals were added, the final slurry volume inside the high-pressure reactor was measured to be 62-66 L.

The high-pressure reactor was heated to 160-165° C. to commence the hydrothermal reaction. The reactor was heated externally, no hotter than 185° C., to obtain a slurry temperature of 160-165° C. (target 163° C.). The high-pressure reactor used was approx. 1000 kg and the resulting heat up time to go from 60° C. to 163° C. was typically 5 hours. The high-pressure reactor pressure was maintained at a pressure of 95-105 psig using a back-pressure regulator built into the reactor head. It may be noted that the saturated vapor pressure of water at 163° C. is 84 psig. The back-pressure regulator vented off excess $CO_x$ pressure, which was a product of oxalate/oxalic acid decomposition. A condenser was used before the back-pressure regulator to prevent excess water losses during the reaction. A tube-in-tube exchanger was used as a condenser, where the shell side was cooled with water and recirculated to a cooling bath controlled to 11° C. During the high pressure/temperature reaction, the slurry was stirred using a paddle-style agitator, which was set to a speed (150 rpm) sufficient to suspend the solid and prevented them from settling to the bottom. Based on the multiple batches produced in the examples, the reactor yield measured was approx. 1.43 kg of catalyst composition (dry, uncalcined) for every 1 kg of $(NH_4)_6Mo_7O_{24}\cdot 4H_2O$(s) used and therefore, the slurry concentration is approx. 0.11 $kg_{solids}/L_{slurry}$.

The solids in the slurry from the hydrothermal reaction are filtered and recovered. After the hydrothermal reaction time was reached, the reactor was cooled naturally to 30-60° C. before filtration. Cooling time is in the range of 17-20 hours. During cool down, the stirring was left on at the same rate used during the hydrothermal reaction. Solids separated from mother liquor will be referred to as unwashed catalyst compositions or catalyst compositions (e.g., catalyst compositions that have been washed). Slurry material was transferred from the high-pressure reactor to filter unit through a cannulation method. Slurry transfer was done using positive air pressure of less than 15 psig. The unwashed catalyst composition was washed with distilled water to remove the water-soluble by-product salts that included compounds of: vanadium, ammonium, and sulfate. The filtrate started with a blue color and eventually turned clear as washing proceeded to completion. A 30-35 cm deep pre-catalyst filter cake was washed with distilled water in a ratio that will be specified for each of the catalyst compositions, 1.1-1.8.

The general procedure described above was commonly applied up to this point to produced catalyst compositions 1.1-1.8. However, the procedure deviated in the workup (washing, treatment, and calcination) to produce different Catalyst Compositions 2.1-2.13 and Catalyst Materials (Examples 1-22).

The unwashed catalyst composition filter cake was washed in 20-40 L increments of distilled water up to a total of 100-200 L total (specified total volumes given for each catalyst composition, 1.1-1.8). As noted before, it was assumed that for every 1 kg of $(NH_4)_6Mo_7O_{24}\cdot 4H_2O$ (s) used, approx. 1.43 kg of pre-catalyst material was produced (typical dry, weight yields were 5.9-6.3 kg, 85-91%) and this weight was used to calculate the target amount of water required for washing, e.g., a water (L)-per-catalyst (kg) washing ratio. For example, if 6.96 kg of pre-catalyst was theoretically produced and 100 L of distilled water was used to rinse the solids, then the washing ratio was of 14.37 L/kg.

For some catalyst compositions, qualitative and quantitatively determinations of sulfate residues (as well as N) were done through FTRI and CHNS analysis, respectively. For FTIR and CHNS analysis, a sub-sample (about 5 g) of the catalyst compositions was taken. The catalyst compositions were analyzed as dried solids. Solids were dried at 90° C. in a drying oven for approximate 12 hours. A dry sample will have less than 2% moisture, as determined by TGA-FTIR analysis at 100° C.

Figure 6:
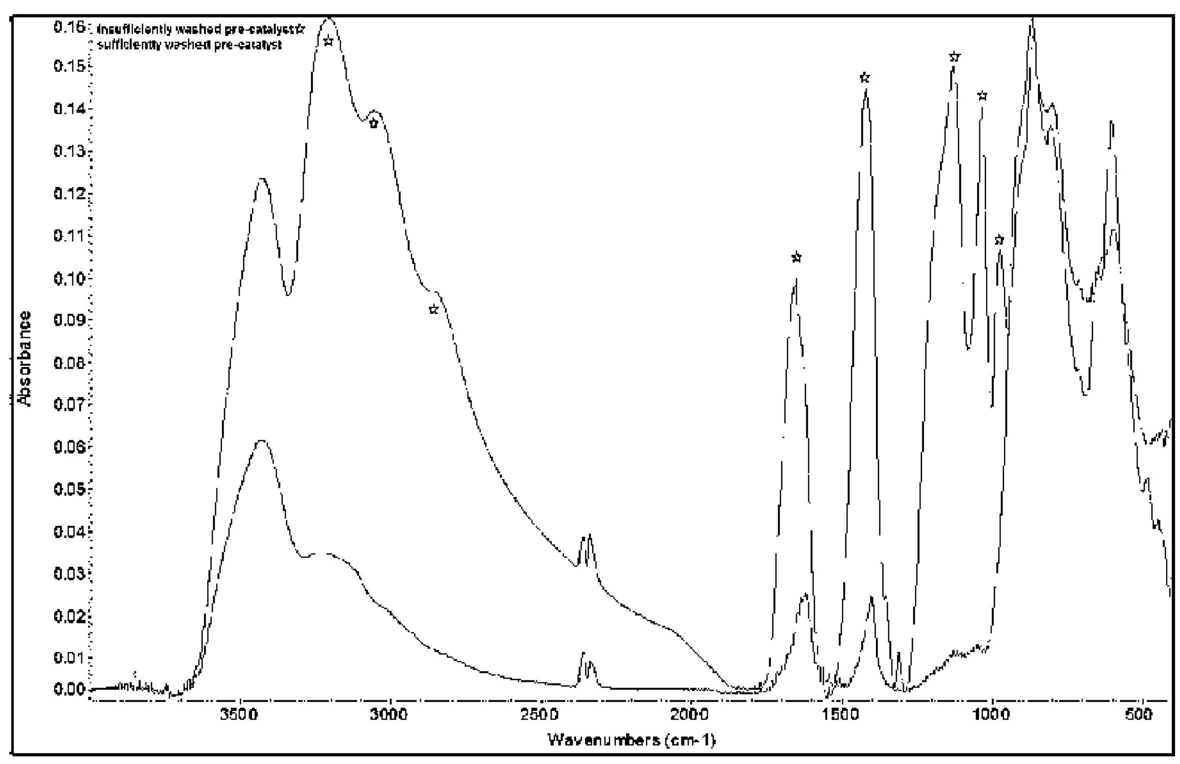
FIG. 6 is a plot showing the infrared spectrum of an insufficiently washed catalyst composition overlaid against a sufficiently washed catalyst composition.

FIG. 6 is a plot 600 of infrared spectra for sufficiently and insufficiently washed catalyst compositions. It was found that FTIR analysis could be used for validating a washing technique, as the ammonium and sulfate peaks produce a diagnostic fingerprint, as can be seen by comparing the spectra in FIG. 2. FTIR made apparent catalyst compositions that were far from sufficiently washed and did not produce a high activity catalyst, even for small-scale calcinations, e.g. less than 100 g.

Surprisingly, it was found that for catalyst compositions which yielded high activity catalysts via a large-scale calcination (e.g., greater than about 500 g) had low measured sulfur wt. % (arising from sulfate species). These sulfur wt. % values were below the detection limit of FTIR for sulfate. The measured sulfur wt. % were used as specification targets for catalyst compositions that led to high activity catalyst materials through not only a small-scale calcination but crucially for large-scale calcinations. In general, for the inventive examples, the weight percentage nitrogen and sulfur in the dry, catalyst compositions were N between about 0.90 and 1.75 wt. %, whereas the S values were required to be less than 0.02 wt. %. These specifications were accomplished through either a 1) copious water washing of catalyst compositions, with a distilled water-to-catalyst ratio of: 73.4 L/kg (e.g., Catalyst Composition 1.6 and corresponding Catalyst Material 4.4; Example 21) or 2)

air-treatment step (as described in several of the examples provided). The details of theses workups are provided in the following written examples and are contrasted against comparative examples that did not receive these workups.

Synthesis of Catalyst Composition 1.1

After completing the hydrothermal reaction described above in the Common synthesis procedure, the catalyst composition slurry was transferred to an approx. 130 L capacity filtration unit (similar to a Nutsche Pressure Filter) via cannulation (positive pressure) from the high-pressure reactor (used for hydrothermal reaction). A catalyst cake (35 cm diameter by 30-35 cm high cylindrical cake) of solid catalyst composition was formed through a positive pressure filtration (up to 15 psig air pressure was used) on top of two sheets (one of each) of polypropylene (PP) filter media, specifically: 1) 1× layer of Clear Edge, woven PP filter cloth, 10.7 OZ MO/MU 7/1SAT HS/K 37 CFM and 2) 1× layer of Pope Scientific Inc, 10-micron polypropylene filter cloth, Part No: 7PPVCLO10MICRON.

The catalyst cake was washed with 120 L of distilled water to remove soluble by-product slats, such as ammonium and sulfate, in 3×40 L portions. The dark purple catalyst cake was removed from the filter unit and spread evenly into two rectangular drying pans (approx. 16.75 L volume; dimensions of 48.26×39.05×8.89 cm), and a cutout tool was pressed into the cake so that when the catalyst composition dried, discrete rectangular-cubes of a desired dimension were obtained. The catalyst cake was dried in an oven at 90° C. for 5 days to remove excess moisture. Once the catalyst cake was dry, the resulting purple, solid cubes were ground using a blade (cutting) grinder. The resulting ground powder was Catalyst Composition 1.1, which was weighed to be 6308.3 g, a weight yield of 83% (assuming theoretical yield of 7598.07 g).

Synthesis of Catalyst Composition 1.2

Catalyst Composition 1.2 was produced with the same procedure as Catalyst Composition 1.1 with the following exceptions: 1) catalyst cake was washed with 80 L of distilled water in 1×40 and 2×20 L portions, 2) Once the catalyst cake was dry, the resulting purple, solid cubes were fed into the hopper of a jaw-crusher grinder (Retsch BB50), which ground the catalyst composition to a size distribution of 125-500 microns by setting the grinder's jaw gap width to 0.5 mm, and 3) the catalyst composition yield was slightly different at 6323.6 g, a weight yield of 83%. Catalyst Material 1.2 was analyzed by CHNS and results obtained are presented in Table 1.1. Catalyst Composition 1.2 was submitted for MRU performance testing, the results of which are given in Table 2.3.

Synthesis of Catalyst Composition 1.3

Catalyst Composition 1.3 was produced with the same procedure as Catalyst Composition 1.1 with the following exceptions: 1) the catalyst cake was washed with 100 L of distilled water in 1×40 and 3×20 L portions, 2) the catalyst composition was dried at 90° C. for 7 days in a large pot (which took longer than without a drying pan or cutout tool), and 3) catalyst composition yield was slightly different at 6233.0 g, a weight yield of 82%.

Synthesis of Catalyst Composition 1.4

Catalyst Composition 1.4 was produced with the same procedure as Catalyst Composition 1.1 with the following exceptions: 1) catalyst cake was washed with 120 L of distilled water in 3×40 L portions, and 2) catalyst composition yield was slightly different at 6092.0 g, a weight yield of 80%.

Synthesis of Catalyst Composition 1.5

Catalyst Composition 1.5 was produced in the same procedure as Catalyst Composition 1.2. Catalyst Composition 1.5 and Catalyst Composition 1.6 arose from the same preparation, but with different amounts of distilled water washings. This was accomplished by washing Catalyst Composition 1.5 with 80 L of distilled water in 1×40 and 2×20 L portions and then after the 80 L volume of distilled water washing, about 67% of the wet, solid catalyst composition was taken out of the filter unit and worked up through drying and grinding. The removed portion was Catalyst Composition 1.5 and the remaining about 33% would be further washed with distilled water to produce Catalyst Composition 1.6.

The wet Catalyst Composition 1.5 was dried at 90° C. for approx. 5 days in an oven using an oven and drying pan/cutout tool, as described previously for Catalyst Composition 1.1 preparation. Once the catalyst composition was dry, the resulting purple, solid cubes were fed into the hopper of a jaw-crusher grinder (Retsch BB50), which ground the catalyst composition to a size distribution of 125-500 microns by setting the grinder's jaw gap width to 0.5 mm. Catalyst Composition 1.5 yield was approx. 4 kg.

The combined mass of Catalyst Composition 1.5 and 1.6 was 5970.2 g, a weight yield of 79%. Based on this weighed yield, the washing ratio was about 13.4 L of distilled water per kg of recovered solid. Catalyst Material 1.5 was analyzed by CHNS and results obtained are presented in Table 1.1.

Synthesis of Catalyst Composition 1.6 (Double Washed)

The remaining portion of Catalyst Composition 1.5 was returned to the filter unit and washed with an additional 120 L of distilled water (in 40 L portions) to produce Catalyst Composition 1.6. After washing with distilled water, the wet Catalyst Composition 1.6 was dried and ground in the same way at Composition 1.5, e.g., dried in an oven using a drying pan/cutout tool and ground using a jaw crusher with jaw gap width of 0.5 mm. Catalyst Composition 1.6 yield was approx. 2 kg. Based on this weighed yield and the previous washing of 13.4 L/kg, the washing ratio for the about 2 kg of Catalyst Composition 1.6 was about 73.4 L of distilled water per kg of recovered solid (120 L/2=60 L; 60 L+13.4 L=73.4 L). The combined mass of Catalyst Composition 1.5 and 1.6 was 5970.2 g, a weight yield of 79%. Catalyst Material 1.6 was analyzed by CHNS and results obtained are presented in Table 1.1.

Synthesis of Catalyst Composition 1.7

Catalyst Composition 1.7 was produced with the same procedure as Catalyst Composition 1.1 with the following exceptions: 1) the catalyst cake was washed with 100 L of distilled water in 1×40 and 3×20 L portions. 2) Once the catalyst cake was dry, the resulting purple, solid cubes were fed into the hopper of a jaw-crusher grinder (Retsch BB50), which ground the catalyst composition to a size distribution of 125-500 microns by setting the grinder's jaw gap width to 0.5 mm. 3) The catalyst composition yield was slightly different at 5877 g, a weight yield of 77%. It can be noted that Catalyst Composition 1.7 used 18.01 moles (4043 g) of $VOSO_4$ salt during the hydrothermal reaction step. Catalyst Material 1.7 was analyzed by CHNS and results obtained are presented in Table 1.1.

Synthesis of Catalyst Composition 1.8 (Reduced V Loading)

Catalyst Composition 1.8 was produced with the same procedure as Catalyst Composition 1.7, except that the amount of $VOSO_4 \cdot 3.41H_2O$ salt was reduced from 18.01 moles (4043 g) to 15.08 moles (3369 g), i.e., an approx. 16% reduction in vanadium loading. The rest of the workup (washing, drying, and grinding) was the same as Catalyst Composition 1.8.

The reduced vanadium loading had a calculated change on the catalyst theoretical yield of 3369 g of $VOSO_4 \cdot 3.41H_2O$ (15.08 mol) with a corresponding theoretical weight yield of $V_2O_5$=1371.4 g $V_2O_5$ (7.54 mol). Thus, a reduction of about 267 g of $V_2O_5$ (1638-1371) mass is expected for Catalyst Composition 1.8 as compared to Catalyst Composition 1.7. This mass reduction corresponds to a theoretical yield of oxides of 7331.07 g of mixed-metal-oxides.

Catalyst Composition 1.8 weight yield was 6062 g after drying and grinding, a weight yield of 83%, assuming a theoretical yield of 7331.07 g. Catalyst Composition 1.8 was analyzed by CHNS and results obtained are presented in Table 1.1.

Analysis of C, N, & S wt. % via CHNS for Catalysts Compositions 1.1-1.8

TABLE 1.1

LECO CHNS results for Catalyst Compositions 1.1-1.8, where each sample was tested after filtration, drying, and grinding step.

| Sample ID | C wt. %* | N wt. %* | S wt. %* |
|---|---|---|---|
| Catalyst Composition 1.1 | not measured | | |
| Catalyst Composition 1.2 | 0.042 | 1.75 | 0.87 |
| Catalyst Composition 1.3 | not measured | | |
| Catalyst Composition 1.4 | not measured | | |
| Catalyst Composition 1.5 | 0.081 | 1.26 | 0.79 |
| Catalyst Composition 1.6 (double washed) | 0.005 | 0.92 | 0.022 |
| Catalyst Composition 1.7 | 0.042 | 1.10 | 0.342 |
| Catalyst Composition 1.8 (reduced V loading) | — | 1.25 | 0.062 |

*For the results presented, the C, N, S wt. % were collected on Catalyst Compositions 1.1-1.8 before any air treatments or calcinations.

Treated Catalyst Compositions 2.1-2.13 (330° C. and 250° C. Air Treated Samples)

Example 1: Synthesis of Catalyst Composition 2.1 (AT330C-1 hr) (AT is air treatment)

A portion of the total mass of Catalyst Composition 1.1 was loaded into three quartz boats (half cylinder shape of approx. dimensions of 13 cm diameter, 6.4 cm depth, 32.3 cm length). Each quartz boat was loaded with the approximately same volume (about 1224 $cm^3$) of catalyst composition and the total mass loading for all three boats was 3288.8 g of Catalyst Composition 1.1, i.e., before treatment to form Catalyst Composition 2.1. The quartz boats containing the catalyst composition were loaded into a quartz tube for high temperature air treatment and subsequent high temperature nitrogen calcination. The quartz tube length was 180 cm and had inner diameter of 14 cm. The tube furnace was a Carbolite Gero GHA12/1200, which had a name-plate max wattage of 7.02 kW and built in thermocouples, as well as temperature control programming features.

The quartz tube was sealed with flanges and the tube was purged with 2 psig bulk nitrogen (less than 10 ppm oxygen) at flow rate of 1000 sccm (standard cubic cm). The outlet side of the tube was vented through a water bubbler, which was used to keep the tube under an anaerobic atmosphere by preventing air backflow.

The nitrogen purge proceeded for 8 hours, after which, the tube was heated up to 330° C. at a rate of 1.6° C./min and then held at 330° C. for approx. 30 mins. After 30 minutes at 330° C., the heating furnace was turned off and immediately (not allowing the tube too cool down) the entirety of the tube was exposed to ambient air atmosphere by removing the inlet flange allowing the air to diffuse into the tube by natural draft. The ambient, air-treatment at 330° C. was estimated to be one hour. The whole calcination setup cooled to room temperature overnight to produce Catalyst Composition 2.1.

Catalyst Composition 2.1 was not removed from the quartz tube in order to be weighed or characterized, but was processed by calcination to produce Catalyst Material 2.1, following the procedure discussed in Example 1B, below.

Example 2: Synthesis of Catalyst Composition 2.2 (AT330C-2 hrs)

Approx. 17 g of Catalyst Composition 1.2 was loaded into an 8-dram glass vial and air treated at 330° C. for 2 hours in a muffle furnace to form Catalyst Composition 2.2. The muffle furnace was heated up, in air, to a target temperature of 330° C. in 45 minutes.

Catalyst Composition 2.2 was processed by calcination to produce Catalyst Material 1.1, following the procedure discussed in Example 2B. Catalyst Composition 2.2 was analyzed by CHN, the results of which are given in Table 2.1. Catalyst Composition 2.2 was submitted for MRU performance testing, the results of which are given in Table 2.3.

Example 3: Synthesis of Catalyst Composition 2.3 (AT330C-6 hrs)

Approx. 17 g of Catalyst Composition 1.2 was loaded into an 8-dram glass vial and air treated at 330° C. for 6 hours in a muffle furnace to form Catalyst Composition 2.3. The muffle furnace was heated up, in air, to a target temperature of 330° C. in 45 minutes.

Catalyst Composition 2.3 was processed by calcination to produce Catalyst Material 1.2, following the procedure discussed in Example 3B. Catalyst Composition 2.3 was analyzed by CHN, the results of which are given in Table 2.1. Catalyst Composition 2.3 was submitted for MRU performance testing, the results of which are given in Table 2.3.

Example 4: Synthesis of Catalyst Composition 2.4 (AT330C-12 hrs)

A 907.9 g g portion of Catalyst Composition 1.2 was loaded into a single quartz boat (half cylinder shape of approx. dimensions of 13 cm diameter, 6.4 cm depth, and 32.3 cm length). The quartz boat containing the catalyst composition was loaded into a muffle furnace and heated up, in air, to a target temperature of 330° C. in 45 minutes. The oven was held at 330° C. under ambient air for 12 hours, after which the furnace was cooled down to room temperature overnight. The resulting 330° C. air treated material was Catalyst Composition 2.4.

Catalyst Composition 2.4 was process by calcination to produce Catalyst Material 2.2, following the procedure discussed in Example 4B. Catalyst Composition 2.4 was analyzed by CHN, the results of which are given in Table 2.1. Catalyst Composition 2.4 was submitted for MRU performance testing, the results of which are given in Table 2.3.

Example 5: Synthesis of Catalyst Composition 2.5 (AT330C-12 hrs)

Catalyst Composition 2.5 is formed from a 17 g sub sample of the 1381.25 g of Catalyst Composition 2.4. Catalyst Composition 2.5 was use for a small-scale calcination to produce Catalyst Material 1.3, following the procedure discussed in Example 5B.

Example 6: Synthesis of Catalyst Composition 2.6 (AT330C-3 hrs)

A portion of the total mass of Catalyst Composition 1.3 was loaded into two quartz boats (half cylinder shape of approx. dimensions of 13 cm diameter, 6.4 cm depth, and 32.3 cm length). Each quartz boat was loaded with the approximately same volume (about 1224 $cm^3$) of catalyst and the total mass loading for all three boats was 2905.0 g of Catalyst Composition 1.3. Catalyst Composition 1.3 was further dried in a convection oven overnight at 90° C. Catalyst Composition 1.3 dry weight was 2873.5 g (dry mass).

The quartz boats containing the catalyst composition were loaded into a quartz tube for high temperature air treatment and subsequent high temperature nitrogen calcination. The quartz tube length was 180 cm and had inner diameter of 14 cm. The tube furnace was a Carbolite Gero GHA12/1200, which had a name-plate max wattage of 7.02 kW and built in thermocouples, as well as temperature control programming features.

The quartz tube was sealed with flanges and left under stagnant, air atmosphere. The outlet side of the tube was vented through a water bubbler and the inlet side was a source of nitrogen for calcination steps. The furnace was heated up to 330° C. at a rate of 1.6° C./min under stagnant air. Once the temperature of 330° C. was reached (in about 3 hours), the tube was purged with 2 psig bulk nitrogen (less than 10 ppm oxygen) at flow rate of 1000 sccm (standard cubic cm) from inlet side of the quartz tube. The air-treatment step of Catalyst Composition 1.3 formed Catalyst Composition 2.6. Catalyst Composition 2.6 was not isolated or weighed, but instead was immediately processed by nitrogen calcination step to produce Catalyst Material 2.3, following the procedure discussed in Example 6B.

Example 7: Synthesis of Catalyst Composition 2.7 (AT250C-less than 1 hrs)

A 2356.9 g portion of Catalyst Composition 1.3 was loaded into quartz boats (half cylinder shape of approx. dimensions of 13 cm diameter, 6.4 cm depth, and 32.3 cm length). The quartz boats containing catalyst composition was loaded into a convection oven and further dried at 90° C. overnight. After cooling the Catalyst Composition 1.3 down, the dry weight was recorded to be 2322.9 g.

The dried Catalyst Composition 1.3 was then loaded back into the convection oven and heated up, in air, to a target temperature of 250° C. in under 1 hour. Once the temperature of 250° C. was reached in the oven, the oven was turned off and cooled down to room temperature overnight. The resulting air treated material (less than 1 hour at 250° C.) was Catalyst Composition 2.7. Catalyst Composition 2.7 was processed by calcination to produce Catalyst Material 2.4, following the procedure discussed in Example 7B.

Example 8: Synthesis of Catalyst Composition 2.8 (AT250C-5 hrs)

A 966.9 g portion of Catalyst Composition 1.3 was loaded into a single quartz boat (half cylinder shape of approx. dimensions of 13 cm diameter, 6.4 cm depth, and 32.3 cm length). The quartz boat containing the catalyst composition was loaded into a convection oven and further dried at 90° C. overnight. After cooling the Catalyst Composition 1.3 to ambient temperature, e.g., about 21° C., the dry weight was recorded to be 940.0 g.

The dried Catalyst Composition 1.3 was then loaded back into the convection oven and heated up, in air, to a target temperature of 250° C. in under 1 hour. Once the temperature of 250° C. was reached in the oven, the oven was left at 250° C. for 5 hours, after which the oven was turned off and allowed to cool down to room temperature overnight. The resulting about air treated material (about 5 hours at 250° C.) was Catalyst Composition 2.8. Catalyst Composition 2.8 was processed by calcination to produce Catalyst Material 2.5, following the procedure discussed in Example 8B.

Example 9: Synthesis of Catalyst Composition 2.9 (AT250C-6 hrs)

A 3075.6 g portion of Catalyst Composition 1.4 was loaded into three quartz boats (half cylinder shape of approx. dimensions of 13 cm diameter, 6.4 cm depth, and 32.3 cm length). Each quartz boat was loaded with the approximately same volume (about 1224 $cm^3$) of catalyst composition. The quartz boats containing catalyst composition were loaded into a convection oven and further dried at 90° C. overnight.

The dried Catalyst Composition 1.4 was then loaded back into the convection oven and heated up, in air, to a target temperature of 250° C. in under 1 hour. Once the temperature of 250° C. was reached in the oven, the oven was left at this target temperature of 250° C. for 6 hours, after which, the oven was turned off and allowed to cool down to room temperature overnight. The resulting air treated material (about 6 hours at 250° C.) was Catalyst Composition 2.9, which was weighed at 3043.9 g, a loss of mass of only 1% for 250° C. air treatment. Catalyst Composition 2.9 was processed by calcination to produce Catalyst Material 2.6, following the procedure discussed in Example 9B.

Example 10: Synthesis of Catalyst Composition 2.10 (AT250C-6 hrs)

The remaining 1641.7 g of Catalyst Composition 1.4 was loaded into two quartz boats and air treated with the same equipment and procedure as outlined for Catalyst Composition 2.9 (i.e., procedure was duplicated to demonstrated reproducibility of results using this procedure).

The resulting material was air treated for about 6 hours at 250° C. producing Catalyst Composition 2.10, which was weighed at 1611.2 g, a loss of mass of only 2% for 250° C. air treatment. Catalyst Composition 2.10 was processed by calcination to produce Catalyst Material 2.7, following the procedure discussed in Example 10B.

Example 11: Synthesis of Catalyst Composition 2.11 (doublewashed-AT250C-6 hrs)

The 1138 g of Catalyst Composition 1.6 was loaded into a single quartz boat and air treated with the same equipment and procedure as outlined for Catalyst Composition 2.9. The resulting air treated material (about 6 hours at 250° C.) was Catalyst Composition 2.11. Catalyst Composition 2.11 was processed by calcination to produce Catalyst Material 2.8, following the procedure discussed in Example 11B. Catalyst Composition 2.11 was analyzed by CHN, the results of which are given in Table 2.2.

Example 12: Synthesis of Catalyst Composition 2.12 (AT250C-6 hrs)

The entirety of the 5877 g of Catalyst Composition 1.7 was calcined in two calcinations of equal portions (approx. 2939 g ea.). Both calcinations were done in three quartz boats to process the entire batch of Catalyst Composition 1.7. Before the nitrogen calcination step, Catalyst Composition 1.7 was air treated with the same equipment and procedure as outlined for Catalyst Composition 2.9. The resulting air treated material (about 6 hours at 250° C.) was Catalyst Composition 2.12.

Catalyst Composition 2.12 was processed by calcination to produce Catalyst Material 2.9, following the procedure discussed in Example 12B. Catalyst Composition 2.12 was analyzed by CHN, the results of which are given in Table 2.2.

Example 13: Synthesis of Catalyst Composition 2.13 (AT250C-6 hrs)

5022 g of the total 6062 g (83%) of Catalyst Composition 1.8 was calcined in two calcinations. Before the nitrogen calcination step, Catalyst Composition 1.8 was air treated with the same equipment and procedure as outlined for Catalyst Composition 2.9. The resulting air treated material (about 6 hours at 250° C.) was Catalyst Composition 2.13.

Catalyst Composition 2.13 was processed to calcination to produce Catalyst Material 2.10, following the procedure discussed in Example 13B.

Analysis of N wt. % via CHN for Catalysts Compositions 1.2, & 2.2-2.4

TABLE 2.1

LECO CHN results for Catalyst Compositions 1.2, and 2.2-2.4, where these samples were prepared with different time durations (0-12 hours) of 330° C. air-treatment step.

| Sample ID | Air Treatment Time (hr) at 330° C.[1] | N wt. %[2] |
|---|---|---|
| Catalyst Composition 1.2 | 0 | 1.75 |
| Catalyst Composition 2.2 | 2 | 0.86 |
| Catalyst Composition 2.3 | 6 | 0.36 |
| Catalyst Composition 2.4 | 12 | 0.11 |

[1]This step was performed prior to a calcination under nitrogen at 600° C. for 6 hours to produce catalyst Materials 1.1-1.3 & 3.2.
[2]N wt. % measured on sample (via CHN analysis) after 330° C. air treatment.

A sub-sample of each catalyst composition was taken for MRU testing before working up the balance of the sample to catalyst materials via a 600° C. nitrogen calcination. Catalyst Compositions 1.2, and 2.2-2.4 were all prepared from Catalyst Composition 1.2.

Analysis of N wt. % via CHN for Catalysts Compositions 2.11-2.12.

TABLE 2.2

LECO CHN results for Catalyst Compositions 2.11-2.12, where these samples were prepared with a 6-hour 250° C. air-treatment step.

| Sample ID | C wt. % | N wt. % | S wt. % |
|---|---|---|---|
| Catalyst Composition 2.11 | 0.01 | 1.02 | 0.076 |
| Catalyst Composition 2.12 | — | 0.537 | not measured |

A sub-sample of each catalyst composition was taken for MRU testing before working up the balance of the sample to catalyst materials via a 600° C. nitrogen calcination.

Analysis of Ethane to Ethylene activity and selectivity for Catalysts Materials 1.2, and 2.2-2.4.

TABLE 2.3

MRU results for Catalyst Compositions 1.2, and 2.2-2.4, prepared with a 330° C. air-treatment step.

| Sample ID | Air Treatment Time (hr) at 330° C.[1] | Activity (° C.)[2] | Selectivity (%)[3] |
|---|---|---|---|
| Catalyst Composition 1.2 | 0 | 332 | 81 |
| Catalyst Composition 2.2 | 2 | not measured | |
| Catalyst Composition 2.3 | 6 | 348 | 84 |
| Catalyst Composition 2.4 | 12 | 340 | 85 |

[1]This step was performed prior to a calcination under nitrogen at 600° C. for 6 hours to produce catalyst Materials 1.1-1.3 & 3.2.
[2]Activity is the temperature in which 35 mol % conversion of ethane occurred.
[3]Mol % selectivity towards ethylene at 35 mol % conversion.

A sub-sample of each catalyst composition was taken for MRU testing before working up the balance of the sample to catalyst materials via a 600° C. nitrogen calcination. Catalyst Compositions 1.2, and 2.2-2.4 were all prepared from the same Catalyst Composition 1.2.

Calcinations of Catalyst Material 1.1-1.3 (Air Treatment at 330° C. Before Small-Scale Nitrogen Calcination)

Example 2B: Synthesis of Catalyst Material 1.1 (AT330C-2 hrs)

7.34 g of Catalyst Composition 2.2 was loaded into a quartz boat (half cylinder shape of approx. dimensions of 1.4 cm diameter, 1.3 cm depth, 69 cm length; approx. volume of 10-11 $cm^3$) and loaded into an approx. 2 foot long quartz tube with an inside diameter of about 2.5 cm. The quartz tube was connected to nitrogen purge system via ground glass joints, with the inlet side being a source of nitrogen gas and the outlet side being vented to a water bubbler (used to keep the tube under an anaerobic atmosphere). Bulk nitrogen (less than 10 ppm oxygen) was flowed through the tube at 85 sccm (standard cubic cm) for 8 hours. After 8 hours, the bulk nitrogen was redirected through an oxygen trap (LabClear Oxiclear™ gas purifier) to purge the quartz tube with purified nitrogen (less than 1 ppm oxygen) overnight at 85 sccm. The flow was decreased from 85 sccm to 30 sccm and the tube furnace heater was turned on. The tube furnace heating was applied with the following program: 1) ramp the temperature from room temperature to 600° C., over the span of 6 hours (rate of 1.6° C./min), 2) The controller holds the temperature at 600° C. for 2 hours, and 3) turn off furnace and allow the equipment to cool to room temperature.

After the calcination, the resulting Catalyst Material 1.1 was black and weighed 7.00 g, which corresponds to a calcination weight yield of 95%. Catalyst Material 1.1 was submitted for MRU performance testing, the results of which are given in Table 2.1.

Example 3B continued: Synthesis of Catalyst Material 1.2 (AT330C-6 hrs)

7.45 g of Catalyst Composition 2.3 was calcining following the same procedure and equipment as describe for Catalyst Material 1.1. After the calcination, the resulting Catalyst Material 1.2 was black and weighed 7.19 g, which corresponds to a calcination weight yield of 97%. Catalyst Material 1.2 was submitted for MRU performance testing, the results of which are given in Table 2.1.

Example 5B continued: Synthesis of Catalyst Material 1.3 (AT330C-12 hrs)

6.86 g of Catalyst Composition 2.5 (same base material as Catalyst Composition 2.4) was calcined following the same procedure and equipment as describe for Catalyst Material 1.1. After the calcination, the resulting Catalyst Material 1.3 was black and weighed 6.68 g, which corresponds to a calcination weight yield of 97%. Catalyst Material 1.3 was submitted for MRU performance testing, the results of which are given in Table 2.1.

Analysis of Ethane to Ethylene activity and selectivity for Catalysts Materials 1.1-1.3

TABLE 2.1

MRU results for Catalyst Materials 1.1-1.3, prepared with a 330° C. air-treatment step prior to 600° C. nitrogen calcination, compared against Catalyst Material 3.2.

| Sample ID | Air Treatment Time (hr) at 330° C. in prior Catalyst Composition 2.X formation step.[1] | Activity (° C.)[2] | Selectivity (%)[3] |
|---|---|---|---|
| Catalyst Material 3.2 | 0 | 380 | 97 |
| Catalyst Material 1.1 | 2 | 343 | 84 |
| Catalyst Material 1.2 | 6 | >400[4] | — |
| Catalyst Material 1.3 | 12 | >>400 | — |

[1]Catalyst Materials 1.1-1.3 & 3.2 were produced via calcination under nitrogen at 600° C. for 6 hours prior to MRU testing.
[2]Activity is the temperature (° C.) in which 35 mol % conversion of ethane occurred.
[3]Mol % selectivity towards ethylene at 35 mol % conversion.
[4]Mathematically extrapolated to 479° C.

Catalyst Material 3.2 was prepared with only 600° C. nitrogen treatment, i.e., no-air treatment at 330° C. Catalyst Materials 1.1-1.3 and 3.3 were all prepared from the same base Catalyst Composition 1.2.

Calcinations of Catalyst Material 2.1-2.13 (air treatment at 330° C. or 250° C. before large-scale nitrogen calcination)

Example 1B: Synthesis of Catalyst Material 2.1 (AT330C-1 hr)

The quartz tube was resealed with the flange connections and Catalyst Composition 2.1 was purged with 2 psig bulk nitrogen (less than 10 ppm oxygen) at flow rate of 1000 sccm (standard cubic cm). The outlet side of the tube is vented through a water bubbler to help keep the tube under an anaerobic atmosphere, to prevent air backflow. The quartz tube was purged with bulk nitrogen for approx. 3.5 hours, before the inlet bulk nitrogen was redirected through an oxygen trap (LabClear Oxiclear gas purifier) to purge the quartz tube with purified nitrogen (less than 1 ppm oxygen) overnight at 1000 sccm.

The tube furnace calcined Catalyst Composition 2.1 to Catalyst Material 2.1 with the following heating program: 1) heat up to 250° C. at 1.6° C./min and hold at this temp for 1 hour, 2) Heat up to 300° C. at 1.6° C./min and hold at this temp for 1 hour, 3) heat up at 1.6° C./min to final temperature of 600° C. and dwell for 10 hours, 4) cool down at 1.6° C./min to 100° C., and 5) turn off furnace and allow the equipment to cool to room temperature. The resulting black Catalyst Material 2.1 was removed from the calcination equipment and the combined weight was 3072.2 g, a calcination weight yield of 93.4% (as compared to the weight of Catalyst Composition 2.1 initially loaded).

Catalyst Material 2.1 was analyzed by ICP-MS, the results of which are given in Table 3.4 and Table 3.5. Catalyst Material 2.1 was submitted for MRU performance testing, the results of which are given in Table 3.6.

Example 4B: Synthesis of Catalyst Material 2.2 (AT330C-12 hrs)

Catalyst Composition 2.4, still contained in the same quartz boats used for the air treatment at 330° C. in the muffle furnace, was loaded into the middle of a quartz tube. The quartz tube length was 180 cm and had inner diameter of 14 cm. The tube furnace was a Carbolite Gero GHA12/1200, which had a name-plate max wattage of 7.02 kW and built in thermocouples, as well as temperature control programming features.

The quartz tube was sealed with flanges and the tube was purged with 2 psig bulk nitrogen (less than 10 ppm oxygen) at flow rate of 1000 sccm (standard cubic cm). The outlet side of the tube is vented through a water bubbler, which is used to keep the tube under an anaerobic atmosphere (i.e., by preventing air backflow). The quartz tube was purged with bulk nitrogen for approx. 1 hour, before the inlet bulk nitrogen was redirected through an oxygen trap (LabClear Oxiclear gas purifier) to purge the quartz tube with purified nitrogen (less than 1 ppm oxygen) overnight at 1000 sccm.

The tube furnace calcined Catalyst Composition 2.4 to Catalyst Material 2.2 with the following heating program: 1) heat up to 600° C. at a ramp rate of 1.6° C./min 2) hold at 600° C. for 6 hours, and 3) turn off furnace and allow the equipment to cool to room temperature.

The resulting 885.9 g of black powder was Catalyst Material 2.2, a 98% mass yield based on the 907.9 g of Catalyst Composition 1.2 used. Catalyst Material 2.2 was submitted for MRU performance testing, the results of which are given in Table 3.6.

Example 6B: Synthesis of Catalyst Material 2.3 (AT330C-3 hrs)

Catalyst Composition 2.6 contained in the quartz tube was purged at the temperature of 330° C. with 2 psig bulk nitrogen (less than 10 ppm oxygen; at flow rate of 1000 sccm) for approx. 4 hours. Catalyst Composition 2.6 was then purged for purified nitrogen at 330° C. for 20 hours at the flow rate of 1000 sccm. The inlet bulk nitrogen was redirected through an oxygen trap (LabClear Oxiclear gas purifier) to produce purified nitrogen (less than 1 ppm oxygen) use for purging the quartz tube.

Catalyst Composition 2.6 was calcined to form Catalyst Material 2.3 using the following heating program: 1) heat up from 330° C. to 600° C. at a ramp rate of 1.6° C./min, 2) hold at 600° C. for 4 hours, and 3) turn off furnace and allow the equipment to cool to room temperature. The resulting black powder was Catalyst Material 2.3, yielding 2669.4 g, a 93% calcination mass yield (based on initial, dry mass of Catalyst Composition 1.3). Catalyst Material 2.3 was submitted for MRU performance testing, the results of which are given in Table 3.6.

Example 7B: Synthesis of Catalyst Material 2.4 (AT250C-less than 1 hrs)

The quartz boats containing the treated Catalyst Composition 2.7 were loaded into a quartz tube for high temperature air treatment and subsequent high temperature nitrogen calcination. The quartz tube length was 180 cm and had inner diameter of 14 cm. The tube furnace was a Carbolite Gero GHA12/1200, which had a name-plate max wattage of 7.02 kW and built in thermocouples, as well as temperature control programming features.

The quartz tube was sealed with flanges and the tube was purged with 2 psig bulk nitrogen (less than 10 ppm oxygen) at flow rate of 1000 sccm (standard cubic cm). The outlet side of the tube is vented through a water bubbler, which is used to keep the tube under an anaerobic atmosphere by preventing air backflow. The quartz tube was purged with bulk nitrogen, from the inlet side, for approx. 5 hours, before the inlet bulk nitrogen was redirected through an oxygen trap (LabClear Oxiclear gas purifier) to purge the quartz tube with purified nitrogen (less than 1 ppm oxygen) overnight at 1000 sccm.

The tube furnace calcined Catalyst Composition 2.7 to Catalyst Material 2.4 using the following heating program: 1) heat up from room temperature to 600° C. at a ramp rate of 1.6° C./min 2) hold at 600° C. for 6 hours, and 3) turn off furnace and allow the equipment to cool to room temperature.

The resulting black powder was Catalyst Material 2.4, which weighed 2141.2 g, a 92% calcination mass yield (based on initial, dry mass of Catalyst Composition 1.3). Catalyst Material 2.4 was submitted for MRU performance testing, the results of which are given in Table 3.6.

Example 9B: Synthesis of Catalyst Material 2.6 (AT250C-6 hrs)

The quartz boats containing the treated Catalyst Composition 2.9 were loaded into a quartz tube for high temperature air treatment and subsequent high temperature nitrogen calcination. The quartz tube length was 180 cm and had inner diameter of 14 cm. The tube furnace was a Carbolite Gero GHA12/1200, which had a name-plate max wattage of 7.02 kW and built in thermocouples, as well as temperature control programming features.

The quartz tube was sealed with flanges and the tube was purged with 2 psig bulk nitrogen (less than 10 ppm oxygen) at flow rate of 1000 sccm (standard cubic cm). The outlet side of the tube is vented through a water bubbler, which is used to keep the tube under an anaerobic atmosphere by preventing air backflow. The quartz tube was purged with bulk nitrogen, from the inlet side, for approx. 1 hour, before the inlet bulk nitrogen was redirected through an oxygen trap (LabClear Oxiclear gas purifier) to purge the quartz tube with purified nitrogen (less than 1 ppm oxygen) at 1000 sccm for 6 hours.

Catalyst Composition 2.9 was calcined to Catalyst Material 2.6 in the tube furnace with the following heating program: 1) heat up from room temperature to 600° C. at a ramp rate of 1.6° C./min 2) hold at 600° C. for 6 hours, and 3) turn off furnace and allow the equipment to cool to room temperature.

The resulting black powder was Catalyst Material 2.6, which weighed 2874.4 g, a 94% calcination mass yield (based on air treated Catalyst Composition 2.9 mass). Catalyst Material 2.6 was submitted for MRU performance testing, the results of which are given in Table 3.6.

Example 8B: Synthesis of Catalyst Material 2.5 (AT250C-5 hrs)

The quartz boat containing Catalyst Composition 2.8 was loaded into a quartz tube for high temperature air treatment and subsequent high temperature nitrogen calcination. The nitrogen purging and calcination steps followed for Catalyst Composition 2.8 transformation to Catalyst Material 2.5 were the same as those applied for calcining Catalyst Composition 2.7 into Catalyst Material 2.4. After calcination for 6 hours at 600° C., under nitrogen, the resulting black powder was Catalyst Material 2.5, which weighed 875.2 g, a 94% calcination mass yield (based on initial, dry mass of Catalyst Composition 1.3). Catalyst Material 2.5 was submitted for MRU performance testing, the results of which are given in Table 3.6.

Example 10B: Synthesis of Catalyst Material 2.7 (AT250C-6 hrs)

The quartz boats containing Catalyst Composition 2.10 were loaded into a quartz tube for high temperature air treatment and subsequent high temperature nitrogen calcination. The nitrogen purging and calcination steps followed for Catalyst Composition 2.10 transformation to Catalyst Material 2.7 were the same as those applied for calcining Catalyst Composition 2.6 into Catalyst Material 2.6. This was a replication of the procedures to determine the reproducibility of results.

After calcination for 6 hours, at 600° C., under nitrogen, the resulting black powder was Catalyst Material 2.7, which weighed 1542.6 g, a 96% calcination mass yield (based on air treated Catalyst Composition 2.10 mass). Catalyst Material 2.7 was submitted for MRU performance testing, the results of which are given in Table 3.6.

Example 11B: Synthesis of Catalyst Material 2.8 (doublewashed-AT250C-6 hrs)

The single quartz boat containing Catalyst Composition 2.11 was loaded into a quartz tube for high temperature air treatment and subsequent high temperature nitrogen calcination. The nitrogen purging and calcination steps followed for Catalyst Composition 2.11 transformation to Catalyst Material 2.8 were the same as those applied for calcining Catalyst
Composition 2.6 into Catalyst Material 2.6.

After calcination for 6 hours, at 600° C., under nitrogen, the resulting black powder was Catalyst Material 2.8, which weighed 1063 g, a 93% calcination mass yield, based on the 1138 g of Catalyst Composition 1.6 used in this procedure. Catalyst Material 2.8 was analyzed by CHN, the results of which are given in Table 3.1. Catalyst Material 2.8 was also submitted for MRU performance testing, the results of which are given in Table 3.6.

Example 12B: Synthesis of Catalyst Material 2.9 (normal washed-AT250C-6 hrs)

The two roughly equal portions of about 6 hour 250° C. treated Catalyst Composition 2.12, were calcined in two separate calcinations to workup the nearly 6 kg of solid material. For each calcination, the three quartz boats containing Catalyst Composition 2.12 were loaded into the quartz tube for high temperature nitrogen calcination.

The nitrogen purging and calcination steps followed for Catalyst Composition 2.12 transformation to Catalyst Material 2.9 were the same as those applied for calcining Catalyst Composition 2.6 into Catalyst Material 2.6. After the two calcinations at 600° C., under nitrogen, the total mass of the resulting black powder was 5481 g of Catalyst Material 2.9, which was a 93% calcination mass yield, based on the 5877 g of Catalyst Composition 1.7 used in this procedure. At 5481 g of product recovered, the overall weight yield for Catalyst Material 2.9 was 72% (assuming that the theoretical yield of 7598.07 g, based on the mass of chemicals used for Catalyst Composition 1.7)

Catalyst Material 2.9 was analyzed by CHN, the results of which are given in Table 3.1. Catalyst Material 2.9 was also analyzed by ICP-MS, the results of which are given in Table 3.2 and Table 3.3. Further, Catalyst Material 2.9 was submitted for MRU performance testing, the results of which are given in Table 3.6.

Example 13B: Synthesis of Catalyst Material 2.10 (reduced V, normal wash-AT250C-6 hrs)

The two portions of Catalyst Composition 2.13 were calcined in two separate calcinations to workup the nearly 5 kg of solid material. For each calcination, the quartz boats containing Catalyst Composition 2.13 were loaded into the quartz tube for high temperature nitrogen calcination.

The nitrogen purging and calcination steps followed for Catalyst Composition 2.13 transformation to Catalyst Material 2.10 were the same as those applied for calcining Catalyst Composition 2.6 into Catalyst Material 2.6. After the two calcinations at 600° C., under nitrogen, the total mass of resulting black powder was 4601 g of Catalyst Material 2.10, which was a 92% calcination mass yield, based on the 5022 g of Catalyst Composition 1.8 used in this procedure. At 5022 g of product recovered, the overall weight yield for Catalyst Material 2.9 was estimated to be 80% (assuming that the theoretical yield of 7598.07 multiplied by 83% equals 6306.40 g; mass of chemicals used for Catalyst Composition 1.8 minus the 17% portion of solid product recovered that was used for producing Catalyst Material 4.5). The approximately 8% improvement in mass yield for Example 13, as compared to Example 12 (est. 80% vs. 72%) can be attributed to the reduced amount of $VOSO_4$ starting material used for Catalyst Composition 1.8.

Catalyst Material 2.10 was analyzed by ICP-MS, the results of which are given in Table 3.2 and Table 3.3. Catalyst Material 2.10 was also submitted for MRU performance testing, the results of which are given in Table 3.6.

Analysis of N wt. % via CHN for Catalysts Materials 2.8 and 2.9

TABLE 3.1

LECO CHN results for Catalyst Materials 2.8 and 2.9, where these samples were prepared with a 6-hour 250° C. air-treatment step.

| Sample ID | C wt. % | N wt. % | S wt. % |
|---|---|---|---|
| Catalyst Material 2.8 | 0.004 | 0.195 | 0.0059 |
| Catalyst Material 2.9 | 0.002 | 0.135 | not measured |

Analysis of Mo, V, Nb, and Te Concentrations and mol Ratios via ICP-MS for Catalysts Materials 2.1 and 2.9-2.10

TABLE 3.2

ICP-MS wt. % concentrations for Mo, V, Nb, and Te in Catalyst Materials 2.9 and 2.10.

| Sample | Mo wt. % | V wt. % | Nb wt. % | Te wt. % |
|---|---|---|---|---|
| Catalyst Material 2.9 | 43.634 | 7.591 | 5.711 | 11.476 |
| Catalyst Material 2.10 | 44.826 | 6.934 | 5.430 | 9.181 |

TABLE 3.3

Molar ratios for Catalyst Materials 2.9 and 2.10, where molar ratios were calculated based on ICP-MS results given in Table 3.2. Molar ratios are relative to mols of Mo.

| Sample | Mo molar ratio | V molar ratio | Nb molar ratio | Te molar ratio |
|---|---|---|---|---|
| Catalyst Material 2.9 | 1.00 | 0.33 | 0.14 | 0.20 |
| Catalyst Material 2.10 | 1.00 | 0.29 | 0.13 | 0.15 |

TABLE 3.4

ICP-MS wt. % concentrations for Mo, V, Nb, and Te in Catalyst Materials 2.1 compared to Catalyst Material 3.1 and Catalyst Material 4.1.

| Sample | Mo wt. % | V wt. % | Nb wt. % | Te wt. % |
|---|---|---|---|---|
| Catalyst Material 3.1 | 46.625 | 8.144 | 5.688 | 8.988 |
| Catalyst Material 2.1 | 48.683 | 8.225 | 5.702 | 9.066 |
| Catalyst Material 4.1 | 47.939 | 8.080 | 5.672 | 8.612 |

Catalyst Materials 2.1, 3.1 and 4.1 were all produced from the common Catalyst Composition 1.1 but worked up in different way to produce the final catalyst materials.

TABLE 3.5

Molar ratios for Catalyst Materials 2.1 compared to Catalyst Material 3.1 and Catalyst Material 4.1.

| Sample | Mo molar ratio | V molar ratio | Nb molar ratio | Te molar ratio |
|---|---|---|---|---|
| Catalyst Material 3.1 | 1.00 | 0.33 | 0.13 | 0.14 |
| Catalyst Material 2.1 | 1.00 | 0.32 | 0.12 | 0.14 |
| Catalyst Material 4.1 | 1.00 | 0.32 | 0.12 | 0.14 |

Catalyst Materials 2.1, 3.1 and 4.1 were all produced from the common Catalyst Composition 1.1 but worked up in different way to produce the final catalyst materials. The molar ratios were calculated based on ICP-MS results given in Table 3.4. Molar ratios are relative to moles of Mo.

Analysis of Ethane to Ethylene Activity and Selectivity for Catalysts Materials 2.1-2.10

TABLE 3.6

MRU results for Catalyst Materials 2.1-2.10, prepared with various durations of 330° C. or 250° C. air-treatment step prior to 600° C. nitrogen calcination.

| Sample ID[1] | Air Treatment Temperature: 330° C. or 250° C. | Air Treatment Time (hours) | Activity (° C.)[2] | Selectivity (%)[3] |
|---|---|---|---|---|
| Catalyst Material 2.1 | 350 | 1 | 377 | 95 |
| Catalyst Material 2.2 | 350 | 12 | >>440 | — |
| Catalyst Material 2.3 | 330 | 3 | 396 | 94 |
| Catalyst Material 2.4 | 250 | <1 | 405 | 95 |
| Catalyst Material 2.5 | 250 | 5 | 374 | 97 |
| Catalyst Material 2.6 | 250 | 6 | 380 | 96 |
| Catalyst Material 2.7 | 250 | 6 | 376 | 97 |
| Catalyst Material 2.8 | 250 | 6 | 380 | 99 |
| Catalyst Material 2.9 | 250 | 6 | 380 | 95 |
| Catalyst Material 2.10 | 250 | 6 | 380 | 96 |

[1]Catalyst Materials 2.1-2.10 were subjected to a large-scale (approx. 1 kg or more) nitrogen calcination at 600° C. for 6 hours after air treatment step. MRU testing was carried out on the nitrogen calcined Catalyst Materials.
[2]Activity is the temperature in which 35 mol % conversion of ethane occurred.
[3]Mol % selectivity towards ethylene at 35 mol % conversion.

Catalyst Materials 2.1-2.10 were prepared in a >900 g quantities. The results within this table can be compared against Catalyst Materials 3. X (Table 4.3) and 4. X (Table 5.4) to show the importance of meeting the S wt. % specification of less than about 0.02 wt. %. As described herein, this can be achieved through air treatment or through sufficient washing during filtration, for example, for large-scale calcined materials of greater than about 1 kg. Additionally the results show the catalyst compositions' sensitivity to both temperature and time used for the air treatment step

Calcinations of Catalyst Materials 3.1-3.4 (No Air Treatment Before Small-Scale Nitrogen Calcinations)

Example 14: Synthesis of Catalyst Material 3.1 (no AT)

A representative small-scale calcination (less than 100 g) of Catalyst Material 3.1 was performed by loading a single 20-30 g portion of Catalyst Composition 1.1 into a quartz boat (half cylinder shape of approximate dimensions of 4 cm diameter, 2.0 cm depth, 9.5 cm length approximate volume of about 52 $cm^3$). The quartz boat was loaded into a quartz tube of about 144 cm in length with an inside diameter of about 5.1 cm. The quartz tube was connected to a nitrogen purge system via ground glass joints, with the inlet side being a source of nitrogen gas and the outlet side being vented into a laboratory ventilation header. Bulk nitrogen (less than 10 ppm oxygen) was flowed through the tube at 400 sccm (standard cubic cm) for 8 hours. After 8 hours, the bulk nitrogen was redirected through an oxygen trap (LabClear Oxiclear gas purifier) to purge the quartz tube with purified nitrogen (less than 1 ppm oxygen) for an additional about 12 hours at 400 sccm.

The tube furnace used for calcinations at this scale had a nameplate furnace max wattage of 15.65 KW, with the ability to program custom temperature heating profiles. The tube furnace heating was applied with the following program: 1) ramp the temperature from room temperature to 600° C. over the span of 6 hours (rate of 1.6° C./min), 2) hold the temperature at 600° C. for 2 hours, and 3) turn off furnace and allow the equipment to cool to room temperature. After the calcination, the resulting black powder was Catalyst Material 3.1. Typical calcination mass yields were greater than about 85 wt. %.

Catalyst Material 3.1 was analyzed by ICP-MS, the results of which are given in Table 4.1 and Table 4.2. Catalyst Material 3.1 also was submitted for MRU performance testing, the results of which are given in 4.3.

Example 15: Synthesis of Catalyst Material 3.2 (no AT)

The following small-scale calcination (less than 20 g) was representative of typical calcination. 6.78 g of Catalyst Composition 1.2 was loaded into a quartz boat (half cylinder shape of approx. dimensions of 1.4 cm diameter, 1.3 cm depth, 6.9 cm length; approx. volume of 10-11 $cm^3$) and loaded into a approx. 2 foot long quartz tube with an inside diameter of about 2.5 cm. The quartz tube was connected to nitrogen purge system via ground glass joints, with the inlet side being a source of nitrogen gas and the outlet side being vented to a water bubbler (used to keep the tube under an anaerobic atmosphere). Bulk nitrogen (less than 10 ppm oxygen) was flowed through the tube at 85 sccm (standard cubic cm) for 8 hours. After 8 hours, the bulk nitrogen was redirected through an oxygen trap (LabClear Oxiclear gas purifier) to purge the quartz tube with purified nitrogen (less than 1 ppm oxygen) overnight at 85 sccm. The flow was decreased from 85 sccm to 30 sccm and the tube furnace heater was turned on. The tube furnace heating was applied with the following program: 1) ramp the temperature from room temperature to 600° C. over the span of 6 hours (rate of 1.6° C./min), 2) hold the temperature at 600° C. for 2 hours, and 3) turn the furnace off to allow the sample to cool to room temperature.

After the calcination, the resulting Catalyst Material 3.2 was black and weighed 6.07 g, which corresponds to a calcination weight yield of 90%. Catalyst Material 3.2 was submitted for MRU performance testing, the results of which are given in 4.3.

Example 16: Synthesis of Catalyst Material 3.3 (no AT)

Catalyst Composition 1.3 was calcined into Catalyst Material 3.3 using the same general procedure described for Catalyst Material 3.2. Catalyst Material 3.3 was submitted for MRU performance testing, the results of which are given in 4.3.

Example 17: Synthesis of Catalyst Material 3.4 (no AT)

Catalyst Composition 1.4 was calcined into Catalyst Material 3.4 using the same general procedure described for Catalyst Material 3.1. Catalyst Material 3.4 was analyzed by ICP-MS, the results of which are given in Table 4.1 and Table 4.2. Catalyst Material 3.4 was submitted for MRU performance testing, the results of which are given in 4.3.

Analysis of Mo, V, Nb, and Te concentrations and mol ratios via ICP-MS for Catalysts Materials 3.1 and 3.4.

TABLE 4.1

ICP-MS wt. % concentrations for Mo, V, Nb, and Te in Catalyst Materials 3.1 and 3.4.

| Sample | Mo wt. % | V wt. % | Nb wt. % | Te wt. % |
|---|---|---|---|---|
| Catalyst Material 3.1 | 46.625 | 8.144 | 5.688 | 8.988 |
| Catalyst Material 3.4 | 46.920 | 8.139 | 5.714 | 10.909 |

TABLE 4.2 molar ratios for Catalyst Materials 3.1 and 3.4, where molar ratios were calculated based on ICP-MS results given in Table 4.1. Molar ratios are relative to mols of Mo.

| Sample | Mo molar ratio | V molar ratio | Nb molar ratio | Te molar ratio |
|---|---|---|---|---|
| Catalyst Material 3.1 | 1.00 | 0.33 | 0.13 | 0.14 |
| Catalyst Material 3.4 | 1.00 | 0.33 | 0.13 | 0.17 |

Analysis of Ethane to Ethylene activity and selectivity for Catalysts Materials 3.1-3.4

TABLE 4.3

MRU results for Catalyst Materials 3.1-3.4, prepared with no air-treatment step prior to 600° C. nitrogen calcination.

| Sample ID[1] | Activity (° C.)[2] | Selectivity (%)[3] |
|---|---|---|
| Catalyst Material 3.1 | 367 | 96 |
| Catalyst Material 3.2 | 380 | 97 |
| Catalyst Material 3.3 | 378 | 96 |
| Catalyst Material 3.4 | 375 | 97 |

[1]Catalyst Materials 3.1-3.4 were produced at small scale (approx. 5-20 g) through a nitrogen calcination at 600° C. for 6 hours. MRU testing was carried out on the nitrogen calcined catalyst materials.

[2]Activity is the temperature in which 35 mol % conversion of ethane occurred.

[3]Mol % selectivity towards ethylene at 35 mol % conversion.

Catalyst Materials 3.1-3.4 were prepared in a less than 100 g quantities. The results within this table can be compared against Catalyst Materials 2. X (Table 3.6) and 4. X (Table 5.4) to show the importance of meeting the S wt. % specification of less than about 0.02 wt. %. As described herein, this can be achieved through air treatment or through sufficient washing during filtration, for example, for large-scale calcined materials of greater than about 1 kg.

Calcinations of Catalyst Material 4.1-4.5 (No Air Treatment Before Large-Scale Nitrogen Calcined)

Example 18: Synthesis of Catalyst Material 4.1 (no AT)

2764.9 g of Catalyst Composition 1.1 was loaded into roughly equal portions between three quartz boats (half cylinder shape of approx. dimensions of 13 cm diameter, 6.4 cm depth, and 32.3 cm length). The quartz boats containing catalyst composition was loaded into a convection oven and further dried at 90° C. overnight. After cooling the Catalyst Composition 1.3 down, the dry weight was recorded to be 2669.9 g.

The quartz boats were loaded into the middle of a quartz tube. The quartz tube had dimensions of about 180 cm in length and 14 cm in inner diameter. The tube furnace was a Carbolite Gero GHA1/1200, which had a name-plate max wattage of 7.02 kW and built in thermocouples, as well as temperature control programming features.

The quartz tube was sealed with flanges and the tube was purged with 2 psig bulk nitrogen (less than 10 ppm oxygen) at flow rate of 1000 sccm (standard cubic cm). The outlet side of the tube is vented through a water bubbler, which is used to keep the tube under an anaerobic atmosphere (i.e. prevent air backflow). The quartz tube was purged with bulk nitrogen for approx. 4 hours, before the inlet bulk nitrogen was redirected through an oxygen trap (LabClear Oxiclear gas purifier) to purge the quartz tube with purified nitrogen (less than 1 ppm oxygen) overnight at 1000 sccm.

The tube furnace calcined Catalyst Composition 1.1 to Catalyst Material 4.1 with the following heating program: 1) heat up to 600° C. at a ramp rate of 1.6° C./min 2) hold at 600° C. for 6 hours, and 3) turn off furnace and allow the equipment to cool to room temperature. The resulting 2495.1 g of black powder was Catalyst Material 4.1, a calcination, mass yield of 93.4%.

Catalyst Material 4.1 was analyzed by ICP-MS, the results of which are given in Table 5.2 and Table 5.3. Catalyst Material 4.1 was submitted for MRU performance testing, the results of which are given in 5.4.

Example 19: Synthesis of Catalyst Material 4.2 (no AT)

926 g of Catalyst Composition 1.2 was loaded into a single quartz boats (half cylinder shape of approx. dimensions of 13 cm diameter, 6.4 cm depth, 32.3 cm length). The quartz boat was loaded into the middle of a quartz tube. The quartz tube had dimensions of about 180 cm in length and about 14 cm in inner diameter. The tube furnace was a Carbolite Gero GHA12/1200, which had a name-plate max wattage of 7.02 kW and built in thermocouples, as well as temperature control programming features.

The quartz tube was sealed with flanges and the tube was purged with 2 psig bulk nitrogen (less than 10 ppm oxygen) at flow rate of 1000 sccm (standard cubic cm). The outlet side of the tube was vented through a water bubbler, which was used to keep the tube under an anaerobic atmosphere by preventing air backflow. The quartz tube was purged with bulk nitrogen for approx. 1 hour, before the inlet bulk nitrogen was redirected through an oxygen trap (LabClear Oxiclear gas purifier) to purge the quartz tube with purified nitrogen (less than 1 ppm oxygen) overnight at 1000 sccm.

The tube furnace calcined Catalyst Composition 1.2 to Catalyst Material 4.2 with the following heating program: 1) Heat up to 600° C. at a ramp rate of 1.6° C./min 2) dwell at 600° C. for 6 hours, and 3) turn off furnace and allow the equipment to cool to room temperature.

The resulting 861 g of black powder was Catalyst Material 4.2, a calcination yield of 93%. Catalyst Material 4.2 was submitted for MRU performance testing, the results of which are given in 5.4.

Example 20: Synthesis of Catalyst Material 4.3 (Normal Washed, no AT)

2006 g of Catalyst Composition 1.5 was loaded into two approx. equal portions and loaded into two quartz boats (half cylinder shape of approx. dimensions of 13 cm diameter, 6.4 cm depth, and 32.3 cm length). The quartz boats containing catalyst composition was loaded into a convection oven and further dried at 90° C. overnight.

After cooling the dried Catalyst Composition 1.5, the quartz boats were loaded into the middle of a quartz tube. The quartz tube had dimensions of about 180 cm in length and an inner diameter of 14 cm. The tube furnace was a Carbolite Gero GHA12/1200, which had a name-plate max wattage of 7.02 kW and built in thermocouples, as well as temperature control programming features.

The quartz tube was sealed with flanges and the tube was purged with 2 psig bulk nitrogen (less than 10 ppm oxygen) at flow rate of 1000 sccm (standard cubic cm). The outlet side of the tube is vented through a water bubbler, which is used to keep the tube under an anaerobic atmosphere (i.e. prevent air backflow). The quartz tube was purged with bulk nitrogen for approx. 4 hours, before the inlet bulk nitrogen was redirected through an oxygen trap (LabClear Oxiclear gas purifier) to purge the quartz tube with purified nitrogen (less than 1 ppm oxygen) overnight at 1000 sccm.

The tube furnace calcined Catalyst Composition 1.5 to Catalyst Material 4.3 with the following heating program: 1) heat up to 600° C. at a ramp rate of 1.6° C./min 2) hold at 600° C. for 6 hours, and 3) turn off furnace and allow the equipment to cool to room temperature. The resulting 1945 g of black powder was Catalyst Material 4.3, a calcination, mass yield of 97%.

Catalyst Material 4.3 was analyzed by CHN, the results of which are given in Table 5.1. Catalyst Material 4.3 was submitted for MRU performance testing, the results of which are given in 5.4.

Example 21: Synthesis of Catalyst Material 4.4 (Double Washed; no AT)

945 g of Catalyst Composition 1.6 was calcined into Catalyst Material 4.4 using the same procedure outlined for Catalyst Material 4.3, with the only exception being that instead of two quarts boats, only one quartz boat was used as less material was calcined.

After the calcination for 6 hours at 600° C., under nitrogen, the resulting black powder was Catalyst Material 4.4, weighed 892 g, which corresponded to a 94% calcination mass yield (based on initial mass of Catalyst Composition 1.6, i.e. before the additional drying step of the ground catalyst at 90° C.

Catalyst Material 4.4 was analyzed by CHN, the results of which are given in Table 5.1. Catalyst Material 4.4 was also submitted for MRU performance testing, the results of which are given in 5.4.

Example 22: Synthesis of Catalyst Material 4.5 (Reduced V, Normal Wash, no AT)

1040 g of the total 6062 g (17%) of Catalyst Composition 1.8 was calcined into Catalyst Material 4.5 using the same procedure outlined for Catalyst Material 4.3, with the only exception being that instead of two quarts boats, only one quartz boat was used as less material was calcined.

After the calcination for 6 hour at 600° C., under nitrogen, the resulting black powder was Catalyst Material 4.5, weighed 982 g, which corresponded to a 94% calcination mass yield (based of initial mass of Catalyst Composition 1.8, i.e. before the additional drying step of the ground catalyst had 90° C. Catalyst Material 4.5 was submitted for MRU performance testing, the results of which are given in 5.4.

Analysis of N wt. % via CHN for Catalysts Materials 4.3 and 4.4.

TABLE 5.1

LECO CHN results for Catalyst Materials 4.3 and 4.4 compared against their corresponding precursor Catalyst Compositions 1.5 and 1.6.

| Sample ID | C wt. % | N wt. % | S wt. % |
|---|---|---|---|
| Catalyst Composition 1.5 (normal washed) | 0.081 | 1.26 | 0.79 |
| Catalyst Composition 1.6 (double washed) | 0.005 | 0.92 | 0.022 |
| Catalyst Material 4.3(normal wash) | 0.001 | 0.083 | 0.0072 |
| Catalyst Material 4.4 (double wash) | 0.002 | 0.20 | 0.0025 |

Analysis of Mo, V, Nb, and Te concentrations and mol ratios via ICP-MS for Catalysts Materials 4.1.

TABLE 5.2

ICP-MS wt. % concentrations for Mo, V, Nb, and Te in Catalyst Materials 4.1 compared to Catalyst Material 2.1 and Catalyst Material 3.1.

| Sample | Mo wt. % | V wt. % | Nb wt. % | Te wt. % |
|---|---|---|---|---|
| Catalyst Material 3.1 | 46.625 | 8.144 | 5.688 | 8.988 |
| Catalyst Material 2.1 | 48.683 | 8.225 | 5.702 | 9.066 |
| Catalyst Material 4.1 | 47.939 | 8.080 | 5.672 | 8.612 |

Catalyst Materials 2.1, 3.1, and 4.1 were all produced from the common Catalyst Composition 1.1 but worked up in different way to produce the final catalyst materials.

TABLE 5.3

Molar ratios for Catalyst Materials 4.1 compared to Catalyst Material 2.1 and Catalyst Material 3.1.

| Sample | Mo molar ratio | V molar ratio | Nb molar ratio | Te molar ratio |
|---|---|---|---|---|
| Catalyst Material 3.1 | 1.00 | 0.33 | 0.13 | 0.14 |
| Catalyst Material 2.1 | 1.00 | 0.32 | 0.12 | 0.14 |
| Catalyst Material 4.1 | 1.00 | 0.32 | 0.12 | 0.14 |

Catalyst Materials 2.1, 3.1 and 4.1 were all produced from the common Catalyst Composition 1.1 but worked up in different way to produce the final catalyst materials. The molar ratios were calculated based on ICP-MS results given in Table 5.2. Molar ratios are relative to moles of Mo.

Analysis of Ethane to Ethylene Activity and Selectivity for Catalysts Materials 4.1-4.5

TABLE 5.4

MRU results for Catalyst Materials 4.1-4.5, prepared with no air-treatment step prior to 600° C. nitrogen calcination.

| Sample ID[1] | Activity (° C.)[2] | Selectivity (%)[3] |
|---|---|---|
| Catalyst Material 4.1 | 395 | 94 |
| Catalyst Material 4.2 | 421 | 93 |
| Catalyst Material 4.3 | >>400[4] | — |
| Catalyst Material 4.4 (double washed) | 376 | 98 |
| Catalyst Material 4.5 | 416[4] | 92 |

[1]Catalyst Materials 4.1-4.5 were produced at large scale (>900 g) via a nitrogen calcination at 600° C. for 6 hours. MRU testing was carried out on the nitrogen calcined Catalyst Materials.
[2]Activity is the temperature in which 35 mol % conversion of ethane occurred.
[3]Mol % selectivity towards ethylene at 35 mol % conversion.
[4]Extrapolated from measurements at lower temperature values.

Catalyst Materials 2.1-2.10 were prepared in less than about 900 g quantities. The results within this table can be compared against Catalyst Materials 2. X (Table 3.6) and 3. X (Table 4.3) to show the importance of meeting S wt. % specification of less than about 0.02 wt. %. As described herein, this can be achieved through air treatment or through sufficient washing during filtration, for example, for large-scale calcined materials of greater than about 1 kg.

Exemplary Embodiments

An exemplary embodiment described in examples herein provides a catalyst composition including molybdenum, vanadium, tellurium, niobium, oxygen. In the catalyst composition, the molar ratio of molybdenum to vanadium is from 1:0.05 to 1:0.60, the molar ratio of molybdenum to tellurium is from 1:0.01 to 1:0.30, and the molar ratio of molybdenum to niobium is from 1:0.01 to 1:0.40. Oxygen is present at least in an amount to satisfy the valency of any present metal oxides, and wherein the composition includes less than 1.0 wt. % of sulfur.

In an aspect, the composition includes less than 0.50 wt. % sulfur. In an aspect, the composition includes from 0.001 wt. % to 0.90 wt. % sulfur.

In an aspect, the composition includes from 0.5 wt. % to 3.0 wt. % nitrogen. In an aspect, the composition includes 0.8 wt. % to 2.0 wt. % nitrogen. In an aspect, the composition includes 0.8 wt. % to 1.2 wt. % nitrogen.

In an aspect, the composition includes less than 5.0 wt. % water. In an aspect, the composition includes from 0.01 wt. % to 2 wt. % water.

In an aspect, the catalyst composition includes a molar ratio of molybdenum to vanadium is from 1:0.12 to 1:0.49, the molar ratio of molybdenum to tellurium is from 1:0.01 to 1:0.30, and the molar ratio of molybdenum to niobium is from 1:0.01 to 1:0.30.

In an aspect, the composition is prepared by a method including hydrothermally reacting an aqueous mixture including molybdenum, vanadium, tellurium, and niobium to provide a prewashed composition including more than 0.5 wt. % sulfur, and washing the prewashed composition with a solution including a polar solvent to provide the composition including less than 0.25 wt. % sulfur.

In an aspect, the polar solvent is a water.

In an aspect, the composition is prepared on a scale of at least 200 g. In an aspect, the composition is prepared on at least a kilogram scale. In an aspect, the composition is prepared on scale of about 1 to about 5 tons.

Another exemplary embodiment described in examples herein provides a precalcined catalyst composition including molybdenum, vanadium, tellurium, niobium, oxygen, and sulfur. In the catalyst composition, the molar ratio of molybdenum to vanadium is from 1:0.05 to 1:0.60, the molar ratio of molybdenum to tellurium is from 1:0.01 to 1:0.30, and the molar ratio of molybdenum to niobium is from 1:0.05 to 1:0.40. Oxygen is present at least in an amount to satisfy the valency of any present metal oxides and sulfur, when present, makes up 0.001 wt. % to 0.25 wt. % of the composition. The composition is prepared by a method that includes hydrothermally reacting an aqueous mixture including molybdenum, vanadium, tellurium, and niobium to provide a prewashed ODH catalyst precursor including more than 0.5 wt. % sulfur, and washing the prewashed ODH catalyst precursor with a solution including a water to provide the ODH catalyst precursor including less than 1.0 wt. % sulfur.

Another exemplary embodiment described in examples herein provides a method of preparing a catalyst composition including molybdenum, vanadium, tellurium, niobium, oxygen, and, optionally, sulfur. In the catalyst composition, the molar ratio of molybdenum to vanadium is from 1:0.05 to 1:0.60, the molar ratio of molybdenum to tellurium is from 1:0.01 to 1:0.30, and the molar ratio of molybdenum to niobium is from 1:0.05 to 1:0.40. Oxygen is present at least in an amount to satisfy the valency of any present metal oxides and sulfur, when present, makes up less than 0.25 wt. % of the composition. The method includes hydrothermally reacting an aqueous mixture including molybdenum, vanadium, tellurium, and niobium to provide a prewashed catalyst composition including more than 0.5 wt. % sulfur, and washing the prewashed catalyst composition with a solution including a polar solvent to provide the catalyst composition including less than 0.25 wt. % sulfur.

In an aspect, the polar solvent includes a water.

In an aspect, the composition includes from 0.01 wt. % to 0.1 wt. % sulfur. In an aspect, the composition includes 0.8 wt. % to 2.0 wt. % nitrogen. In an aspect, the composition includes 0.8 wt. % to 1.2 wt. % nitrogen.

In an aspect, the method prepares at least 200 grams of the composition. In an aspect, the method prepares at least 1 kilogram of the composition. In an aspect, the method prepares about 1 ton to about 5 tons of the composition per batch.

In an aspect, the method further includes providing the aqueous mixture including molybdenum, vanadium, tellurium, and niobium. In an aspect, providing the aqueous mixture including molybdenum, vanadium, tellurium, and niobium includes providing an aqueous mixture including molybdenum, providing an aqueous mixture including tellurium, providing an aqueous mixture including vanadium, providing an aqueous mixture including niobium, and combining the aqueous mixture including molybdenum, the aqueous mixture including tellurium, the aqueous mixture including vanadium, and the aqueous mixture including niobium, to provide the aqueous mixture including molybdenum, vanadium, tellurium, and niobium.

In an aspect, providing the aqueous mixture including vanadium includes preparing the aqueous mixture from a vanadium compound and a water. In an aspect, the vanadium compound includes a vanadium compound selected from a vanadium acetylacetonate, a vanadyl acetylacetonate, a vanadyl stearate, a vanadium naphthenate, a vanadium benzoyl acetonate, a vanadyl sulfate, or a combination thereof.

In an aspect, the vanadium compound includes a vanadyl sulfate. In an aspect, the vanadyl sulfate includes a vanadyl sulfate hydrate.

In an aspect, providing the aqueous mixture including niobium includes preparing the aqueous mixture from at least a niobium pentoxide, an acid, and a water. In an aspect, providing the aqueous mixture including niobium includes preparing the aqueous mixture from at least a niobium pentoxide hydrate, oxalic acid, and a water. In an aspect, providing the aqueous mixture including tellurium includes preparing the aqueous mixture from at least telluric acid (Te(OH)6) and a water.

In an aspect, providing the mixture including molybdenum includes preparing the aqueous mixture from at least an ammonium molybdate tetrahydrate and a water.

In an aspect, the method includes combining the aqueous mixture including molybdenum with the aqueous mixture including tellurium to provide an aqueous mixture including molybdenum and tellurium, combining the aqueous mixture including molybdenum and tellurium with the aqueous mixture including vanadium to provide an aqueous mixture including molybdenum, tellurium, and vanadium, and combining the aqueous mixture including molybdenum, tellurium, and vanadium with the aqueous mixture including niobium to provide the aqueous mixture including molybdenum, vanadium, tellurium, and niobium.

In an aspect, the method includes heating the aqueous mixture including molybdenum and tellurium at a temperature from about 60° C. to about 100° C. In an aspect, the method includes heating the aqueous mixture including molybdenum and tellurium at a temperature of about 80° C. In an aspect, the method includes increasing the pH of the aqueous mixture including molybdenum and tellurium to a pH of about 7.0 to about 8.5. In an aspect, the method further includes increasing the pH of the aqueous mixture including molybdenum and tellurium to a pH from about 7.25 to about 7.75. In an aspect, increasing the pH of the aqueous mixture includes combining an aqueous hydroxide solution with the aqueous mixture including molybdenum and tellurium. In an aspect, increasing the pH of the aqueous mixture including molybdenum and tellurium includes combining ammonium hydroxide with the aqueous mixture including molybdenum and tellurium.

In an aspect, the method further includes decreasing the pH of the aqueous mixture including molybdenum and tellurium to a pH from about 4.0 to about 6.0. In an aspect, the method further includes decreasing the pH to a pH of about 4.75 to about 5.25. In an aspect, decreasing the pH of the aqueous mixture including molybdenum and tellurium includes combining a sulfuric acid with the aqueous mixture including molybdenum and tellurium.

In an aspect, the method further includes heating the aqueous mixture including molybdenum and tellurium to a temperature of about 70° C. to about 90° C., increasing the pH of the aqueous mixture including molybdenum and tellurium to a pH of about 7.25 to about 7.75, and decreasing the pH of the aqueous mixture including molybdenum and tellurium to a pH of about 4.75 to about 5.25 prior to combining the aqueous mixture including vanadium with the aqueous mixture including molybdenum and tellurium.

In an aspect, the method further includes heating the aqueous mixture including molybdenum and tellurium to a temperature of about 70° C. to about 90° C., increasing the pH of the aqueous mixture including molybdenum and tellurium to a pH of about 7.25 to about 7.75, agitating the aqueous mixture including molybdenum and tellurium for about 0.5 hours to about 24 hours, and decreasing the pH of the aqueous mixture including molybdenum and tellurium to a pH of about 4.75 to about 5.25 prior to adding the aqueous mixture including vanadium to the aqueous mixture including molybdenum and tellurium to provide an aqueous mixture including molybdenum, tellurium, and vanadium.

In an aspect, the hydrothermal reaction conditions include a temperature of about 145° C. to about 185° C. In an aspect, the hydrothermal reaction conditions include a temperature of about 160° C. to about 165° C.

In an aspect, the hydrothermal reaction conditions include a pressure of about 75 psig to about 125 psig. In an aspect, the hydrothermal reaction conditions include a pressure of about 95 to about 105 psig.

In an aspect, the hydrothermal reaction conditions include a temperature of about 145° C. to about 185° C. and a pressure of about 75 psig to about 125 psig. In an aspect, the hydrothermal reaction conditions include a temperature of about 160° C. to about 165° C. and a pressure of about 95 psig to about 105 psig.

In an aspect, the hydrothermal reaction time is about 12 hours to about 60 hours. In an aspect, the hydrothermal reaction time is about 24 hours to about 48 hours. In an aspect, the hydrothermal reaction conditions include a temperature of about 145° C. to about 185° C. and a pressure of about 75 psig to about 125 psig for a time of about 12 hours to about 60 hours. In an aspect, the hydrothermal reaction conditions include a temperature of about 160° C. to about 165° C. and a pressure of about 95 psig to about 105 psig for a time of about 24 hours to about 48 hours.

In an aspect, the method further includes filtering the hydrothermal reaction mixture to the prewashed catalyst composition. In an aspect, washing the prewashed catalyst composition includes washing the prewashed catalyst composition with about 11 liters of water per kilogram of prewashed catalyst composition to about 46 liters of water per kilogram of prewashed catalyst composition. In an aspect, washing the prewashed catalyst composition includes washing the prewashed catalyst composition with about 24 liters of water per kilogram of prewashed catalyst composition to about 34 liters of water per kilogram of prewashed catalyst composition. In an aspect, washing the prewashed catalyst composition includes washing the prewashed catalyst composition with about 29 liters of water per kilogram of the prewashed catalyst composition.

In an aspect, the method further includes drying the washed catalyst composition. In an aspect, drying the washed catalyst composition includes reducing the amount of water in the catalyst composition to less than 5 wt. % water in the composition. In an aspect, drying the washed catalyst composition includes reducing the amount of water in the catalyst composition to less than 2 wt. % water in the composition. In an aspect, drying the washed catalyst composition includes reducing the amount of water in the catalyst composition to 0.01 wt. % to 2 wt. % water in the composition.

In an aspect, the washed catalyst composition is dried at a temperature of about 60° C. to about 330° C. In an aspect, the washed catalyst composition is dried at a temperature of about 200° C. to about 300° C. In an aspect, the washed catalyst composition is dried at a temperature of about 250° C. In an aspect, the washed catalyst composition is dried at a temperature of about 70° C. to about 110° C. In an aspect, the washed catalyst composition is dried at a temperature of about 90° C. In an aspect, the washed catalyst composition is dried at a temperature of about 60° C. to about 330° C. for about 1 hour to about 240 hours. In an aspect, the method further includes an air treatment to provide the catalyst composition.

In an aspect, the method further includes comminuting the catalyst composition. In an aspect, the average particle size of comminuted catalyst composition is from about 50 μm to about 1,000 μm. In an aspect, the average particle size of comminuted catalyst composition is from about 125 μm to about 500 μm.

Another exemplary embodiment described in examples herein provides a catalyst material including molybdenum, vanadium, tellurium, niobium, and oxygen. In the catalyst material, the molar ratio of molybdenum to vanadium is from 1:0.12 to 1:0.49, the molar ratio of molybdenum to tellurium is from 1:0.01 to 1:0.30, and the molar ratio of molybdenum to niobium is from 1:0.01 to 1:0.30. Oxygen is present at least in an amount to satisfy the valency of any present metal oxides and sulfur, when present, includes less than 0.01 wt. % of the catalyst material.

In an aspect, the molar ratio of molybdenum to vanadium is from 1:0.20 to 1:0.45, the molar ratio of molybdenum to tellurium is from 1:0.05 to 1:0.25, and the molar ratio of molybdenum to tellurium is from 1:0.05 to 1:0.25. In an aspect, the molar ratio of molybdenum to vanadium is from 1:0.25 to 1:0.40, the molar ratio of molybdenum to tellurium is from 1:0.10 to 1:0.20, and the molar ratio of molybdenum to tellurium is from 1:0.10 to 1:0.20. In an aspect, the molar ratio of molybdenum to vanadium is from 1:0.30 to 1:0.35, the molar ratio of molybdenum to tellurium is from 1:0.13 to 1:0.17, and the molar ratio of molybdenum to tellurium is from 1:0.12 to 1:0.14.

In an aspect, the catalyst material includes less than 0.005 wt. % sulfur. In an aspect, the catalyst material includes less than 0.003 wt. % sulfur.

In an aspect, the catalyst material further includes from 0.01 wt. % to 1.0 wt. % nitrogen. In an aspect, the catalyst material further includes from 0.5 wt. % to 0.3 wt. % nitrogen.

In an aspect, the catalyst material includes from 25 wt. % to 35 wt. % oxygen. In an aspect, the catalyst material includes 27 wt. % to 33 wt. % oxygen.

In an aspect, the catalyst material has a 35% conversion temperature from about 350° C. to about 425° C. In an aspect, the catalyst material has a 35% conversion temperature from about 360° C. to about 390° C. In an aspect, about 370° C. to about 380° C.
In an aspect, of about 75% to about 95%. In an aspect, the catalyst material has a selectivity to ethylene of about 80% to about 90%.

In an aspect, the catalyst material includes a mixed metal oxide having the empirical formula $Mo_{1.0}V_{0.12\text{-}0.49}Te_{0.01\text{-}0.30}Nb_{0.01\text{-}0.30}O_d$, wherein d is a number to satisfy the valence of the oxide. In an aspect, the catalyst material includes a mixed metal oxide having the empirical formula $Mo_{1.0}V_{0.20\text{-}0.45}Te_{0.05\text{-}0.25}Nb_{0.05\text{-}0.25}O_d$, wherein d is a number to satisfy the valence of the oxide. In an aspect, the catalyst material includes a mixed metal oxide having the empirical formula $Mo_{1.0}V_{0.25\text{-}0.40}Te_{0.10\text{-}0.20}Nb_{0.10\text{-}0.20}O_d$, wherein d is a number to satisfy the valence of the oxide. In an aspect, the catalyst material includes a mixed metal oxide having the empirical formula $Mo_{1.0}V_{0.30\text{-}0.35}Te_{0.13\text{-}0.17}Nb_{0.12\text{-}0.14}O_d$, wherein d is a number to satisfy the valence of the oxide.

In an aspect, the catalyst material is prepared by a method including providing a catalyst composition including molybdenum, vanadium, tellurium, niobium, oxygen, and sulfur wherein the molar ratio of molybdenum to vanadium is from 1:0.05 to 1:0.60, the molar ratio of molybdenum to tellurium is from 1:0.01 to 1:0.30, and the molar ratio of molybdenum to niobium is from 1:0.01 to 1:0.40. Oxygen is present at least in an amount to satisfy the valency of any metal oxides. Sulfur makes up less than 0.25 wt. % of the composition. In the method of this aspect, the catalyst composition is calcined to provide the catalyst material.

In an aspect, calcining the catalyst composition includes heating the catalyst composition at a temperature from about 500° C. to about 650° C. In an aspect, calcining the catalyst composition includes heating the catalyst composition at a temperature of about 600° C.

In an aspect, calcining the precalcined catalyst composition includes heating the precalcined catalyst composition at a temperature of about 500° C. to about 650° C. for about 2 hour to about 24 hours. In an aspect, calcining the precalcined catalyst composition includes heating the precalcined catalyst composition at a temperature of about 600° C. for about 6 hours.

In an aspect, providing the precalcined catalyst composition includes hydrothermally reacting an aqueous mixture including molybdenum, vanadium, tellurium, and niobium to provide a prewashed composition including more than 0.5 wt. % sulfur, and washing the prewashed composition with a solution including a polar solvent to provide the precalcined catalyst composition including less than 0.25 wt. % sulfur.

In an aspect, the precalcined catalyst composition includes less than 0.1 wt. % sulfur. In an aspect, the precalcined catalyst composition includes less than 1.2 wt. % nitrogen. In an aspect, the precalcined catalyst composition includes less than 5 wt. % water.

In an aspect, the catalyst material is prepared on a scale of at least 200 g. In an aspect, the catalyst material is prepared on at least a kilogram scale.

Another exemplary embodiment described in examples herein provides a method of preparing a catalyst material including molybdenum, vanadium, tellurium, niobium, oxygen, and sulfur. The method includes hydrothermally reacting an aqueous mixture including molybdenum, vanadium, tellurium, and niobium to provide a prewashed composition including more than 0.5 wt. % sulfur. The method includes washing the prewashed composition with a solution including a polar solvent to provide a catalyst composition including molybdenum, vanadium, tellurium, niobium, oxygen, and sulfur. In the catalyst composition, the molar ratio of molybdenum to vanadium is from 1:0.05 to 1:0.60, the molar ratio of molybdenum to tellurium is from 1:0.01 to 1:0.30, and the molar ratio of molybdenum to niobium is from 1:0.01 to 1:0.40. Oxygen is present in the catalyst composition at least in an amount to satisfy the valency of any present metal oxides. Sulfur makes up less than 0.25 wt. % of the composition. The method includes calcining the catalyst composition to provide the catalyst material, and wherein the molar ratio of molybdenum to vanadium is from 1:0.12 to 1:0.49, the molar ratio of molybdenum to tellurium is from 1:0.01 to 1:0.30, and the molar ratio of molybdenum to niobium is from 1:0.01 to 1:0.30; and wherein oxygen is present at least in an amount to satisfy the valency of any present metal oxides and sulfur, when present, includes less than 0.01 wt. % of the catalyst material.

INDUSTRIAL APPLICABILITY

Catalysts for oxidative dehydrogenation.

The invention claimed is:

1. A catalyst composition comprising molybdenum, vanadium, tellurium, niobium, oxygen, wherein:

the molar ratio of molybdenum to vanadium is from 1:0.05 to 1:0.60;

the molar ratio of molybdenum to tellurium is from 1:0.01 to 1:0.30; and the molar ratio of molybdenum to niobium is from 1:0.01 to 1:0.40; and wherein oxygen is present at least in an amount to satisfy the valency of any present metal oxides, and wherein the composition comprises from 0.001 wt. % to 0.90 wt. % sulfur.

2. The catalyst composition of claim 1, wherein the composition comprises less than 0.50 wt. % sulfur.

3. The composition of claim 1, wherein the composition comprises from 0.5 wt. % to 3.0 wt. % nitrogen.

4. The composition of claim 1, wherein the composition comprises 0.8 wt. % to 2.0 wt. % nitrogen.

5. The composition of claim 1, wherein the composition comprises 0.8 wt. % to 1.2 wt. % nitrogen.

6. The composition of claim 1, wherein the composition comprises less than 5.0 wt. % water.

7. The composition of claim 1, wherein the composition comprises from 0.01 wt. % to 2 wt. % water.

8. The composition of claim 1, wherein:

the molar ratio of molybdenum to vanadium is from 1:0.12 to 1:0.49;

the molar ratio of molybdenum to tellurium is from 1:0.01 to 1:0.30; and the molar ratio of molybdenum to niobium is from 1:0.01 to 1:0.30.

9. The composition of claim 1, wherein the composition is prepared by a method comprising:

hydrothermally reacting an aqueous mixture comprising molybdenum, vanadium, tellurium, and niobium to provide a prewashed composition comprising more than 0.5 wt. % sulfur; and washing the prewashed composition with a solution comprising a polar solvent to provide the composition comprising less than 0.25 wt. % sulfur.

10. The composition of claim 9, wherein the polar solvent is water.

11. A precalcined catalyst composition comprising molybdenum, vanadium, tellurium, niobium, oxygen, and sulfur, wherein:

the molar ratio of molybdenum to vanadium is from 1:0.05 to 1:0.60;

the molar ratio of molybdenum to tellurium is from 1:0.01 to 1:0.30; and the molar ratio of molybdenum to niobium is from 1:0.05 to 1:0.40; and wherein oxygen is present at least in an amount to satisfy the valency of any present metal oxides and sulfur comprises 0.001 wt. % to 0.25 wt. % of the composition; and wherein the composition is prepared by a method comprising:

hydrothermally reacting an aqueous mixture comprising molybdenum, vanadium, tellurium, and niobium to provide a prewashed ODH catalyst precursor comprising more than 0.5 wt. % sulfur; and washing the prewashed ODH catalyst precursor with a solution comprising a water to provide the ODH catalyst precursor comprising less than 1.0 wt. % sulfur.

12. A method of preparing a catalyst composition comprising molybdenum, vanadium, tellurium, niobium, oxygen, and, optionally, sulfur wherein:

the molar ratio of molybdenum to vanadium is from 1:0.05 to 1:0.60;

the molar ratio of molybdenum to tellurium is from 1:0.01 to 1:0.30; and the molar ratio of molybdenum to niobium is from 1:0.05 to 1:0.40; and wherein oxygen is present at least in an amount to satisfy the valency of any present metal oxides and sulfur, when present, comprises less than 0.25 wt. % of the composition; and wherein the method comprises:

hydrothermally reacting an aqueous mixture comprising molybdenum, vanadium, tellurium, and niobium to provide a prewashed catalyst composition comprising more than 0.5 wt. % sulfur; and washing the prewashed catalyst composition with a solution comprising a polar solvent to provide the catalyst composition comprising less than 0.25 wt. % sulfur.

13. The method of claim 12, wherein the polar solvent comprises water.

14. The method of claim 12, wherein the composition comprises from 0.01 wt. % to 0.1 wt. % sulfur.

15. The method of any one of claims 12 to 14, wherein the composition comprises 0.8 wt. % to 2.0 wt. % nitrogen.

16. The method of claim 12, wherein the composition comprises 0.8 wt. % to 1.2 wt. % nitrogen.

17. The method of claim 12, wherein the method further comprises providing the aqueous mixture comprising molybdenum, vanadium, tellurium, and niobium.

18. The method of claim 17, wherein providing the aqueous mixture comprising molybdenum, vanadium, tellurium, and niobium comprises:

providing an aqueous mixture comprising molybdenum;

providing an aqueous mixture comprising tellurium;

providing an aqueous mixture comprising vanadium;

providing an aqueous mixture comprising niobium; and combining the aqueous mixture comprising molybdenum, the aqueous mixture comprising tellurium, the aqueous mixture comprising vanadium, and the aqueous mixture comprising niobium, to provide the aqueous mixture comprising molybdenum, vanadium, tellurium, and niobium.

19. The method of claim 18, wherein providing the aqueous mixture comprising niobium comprises preparing the aqueous mixture from at least a niobium pentoxide hydrate, oxalic acid, and a water.

20. The method of claim 18, wherein providing the aqueous mixture comprising tellurium comprises preparing the aqueous mixture from at least telluric acid ($Te(OH)_6$) and a water.

21. The method of claim 18, wherein providing the mixture comprising molybdenum comprises preparing the aqueous mixture from at least an ammonium molybdate tetrahydrate and a water.

22. The method of claim 18, wherein the method comprises:

combining the aqueous mixture comprising molybdenum with the aqueous mixture comprising tellurium to provide an aqueous mixture comprising molybdenum and tellurium;

combining the aqueous mixture comprising molybdenum and tellurium with the aqueous mixture comprising vanadium to provide an aqueous mixture comprising molybdenum, tellurium, and vanadium; and combining the aqueous mixture comprising molybdenum, tellurium, and vanadium with the aqueous mixture comprising niobium to provide the aqueous mixture comprising molybdenum, vanadium, tellurium, and niobium.

23. The method of claim 22, wherein the method further comprises increasing the pH of the aqueous mixture comprising molybdenum and tellurium to a pH from about 7.25 to about 7.75.

24. The method of claim 22, wherein the method further comprises decreasing the pH to a pH of about 4.75 to about 5.25.

25. The method of claim 22, wherein the method further comprises:

heating the aqueous mixture comprising molybdenum and tellurium to a temperature of about 70° C. to about 90° C.;

increasing the pH of the aqueous mixture comprising molybdenum and tellurium to a pH of about 7.25 to about 7.75;

agitating the aqueous mixture comprising molybdenum and tellurium for about 0.5 hours to about 24 hours; and decreasing the pH of the aqueous mixture comprising molybdenum and tellurium to a pH of about 4.75 to about 5.25 prior to adding the aqueous mixture comprising vanadium to the aqueous mixture comprising molybdenum and tellurium to provide an aqueous mixture comprising molybdenum, tellurium, and vanadium.

26. The method of claim 25, wherein a washed catalyst composition is dried at a temperature of about 250° C.

27. The method of claim 18, wherein the average particle size of a comminuted catalyst composition is from about 125 μm to about 500 μm.

28. The method of claim 17, wherein providing the aqueous mixture comprising vanadium comprises preparing the aqueous mixture from a vanadium compound and a water.

29. The method of claim 28, wherein the vanadium compound comprises a vanadium compound selected from a vanadium acetylacetonate, a vanadyl acetylacetonate, a vanadyl stearate, a vanadium naphthenate, a vanadium benzoyl acetonate, a vanadyl sulfate, or a combination thereof.

30. A catalyst material comprising molybdenum, vanadium, tellurium, niobium, and oxygen, wherein:

the molar ratio of molybdenum to vanadium is from 1:0.12 to 1:0.49;

the molar ratio of molybdenum to tellurium is from 1:0.01 to 1:0.30; and the molar ratio of molybdenum to niobium is from 1:0.01 to 1:0.30; and wherein oxygen is present at least in an amount to satisfy the valency of any present metal oxides, and wherein the catalyst material comprises from 0.001 wt. % to 0.01 wt. % sulfur.

31. The catalyst material of claim 30, wherein:

the molar ratio of molybdenum to vanadium is from 1:0.30 to 1:0.35;

the molar ratio of molybdenum to tellurium is from 1:0.13 to 1:0.17; and the molar ratio of molybdenum to tellurium is from 1:0.12 to 1:0.14.

32. The catalyst material of claim 30, wherein the catalyst material comprises from 0.001 wt. % to 0.003 wt. % sulfur.

33. The catalyst material of claim 30, wherein the catalyst material further comprises from 0.5 wt. % to 0.3 wt. % nitrogen.

34. The catalyst material of claim 30, wherein the catalyst material comprises 27 wt. % to 33 wt. % oxygen.

35. The catalyst material of claim 30, wherein the catalyst material comprises a mixed metal oxide having the empirical formula $Mo_{1.0}V_{0.30\text{-}0.35}Te_{0.13\text{-}0.17}Nb_{0.12\text{-}0.14}O_d$, wherein d is a number to satisfy the valence of the oxide.

36. A method of preparing a catalyst material comprising molybdenum, vanadium, tellurium, niobium, oxygen, and, optionally, sulfur, the method comprising, the method comprising:

hydrothermally reacting an aqueous mixture comprising molybdenum, vanadium, tellurium, and niobium to provide a prewashed composition comprising more than 0.5 wt. % sulfur;

washing the prewashed composition with a solution comprising a polar solvent to provide a catalyst composition comprising molybdenum, vanadium, tellurium, niobium, oxygen, and, optionally, sulfur wherein:

the molar ratio of molybdenum to vanadium is from 1:0.05 to 1:0.60;

the molar ratio of molybdenum to tellurium is from 1:0.01 to 1:0.30; and the molar ratio of molybdenum to niobium is from 1:0.01 to 1:0.40;

wherein oxygen is present at least in an amount to satisfy the valency of any present metal oxides and sulfur, when present, comprises less than 0.25 wt. % of the composition; and calcining the catalyst composition to provide the catalyst material, and wherein the molar ratio of molybdenum to vanadium is from 1:0.12 to 1:0.49, the molar ratio of molybdenum to tellurium is from 1:0.01 to 1:0.30, and the molar ratio of molybdenum to niobium is from 1:0.01 to 1:0.30; and wherein oxygen is present at least in an amount to satisfy the valency of any present metal oxides and sulfur, when present, comprises less than 0.01 wt. % of the catalyst material.

* * * * *